July 2, 1968 C. A. WILMS ETAL 3,390,473
PORTABLE WHEEL EXCAVATOR AND METHOD OF EXCAVATING
Filed March 26, 1964 15 Sheets-Sheet 6

INVENTORS.
FOUAD K. MITTRY, JR.
BY CARL A. WILMS
Parker & Carter
ATTORNEYS.

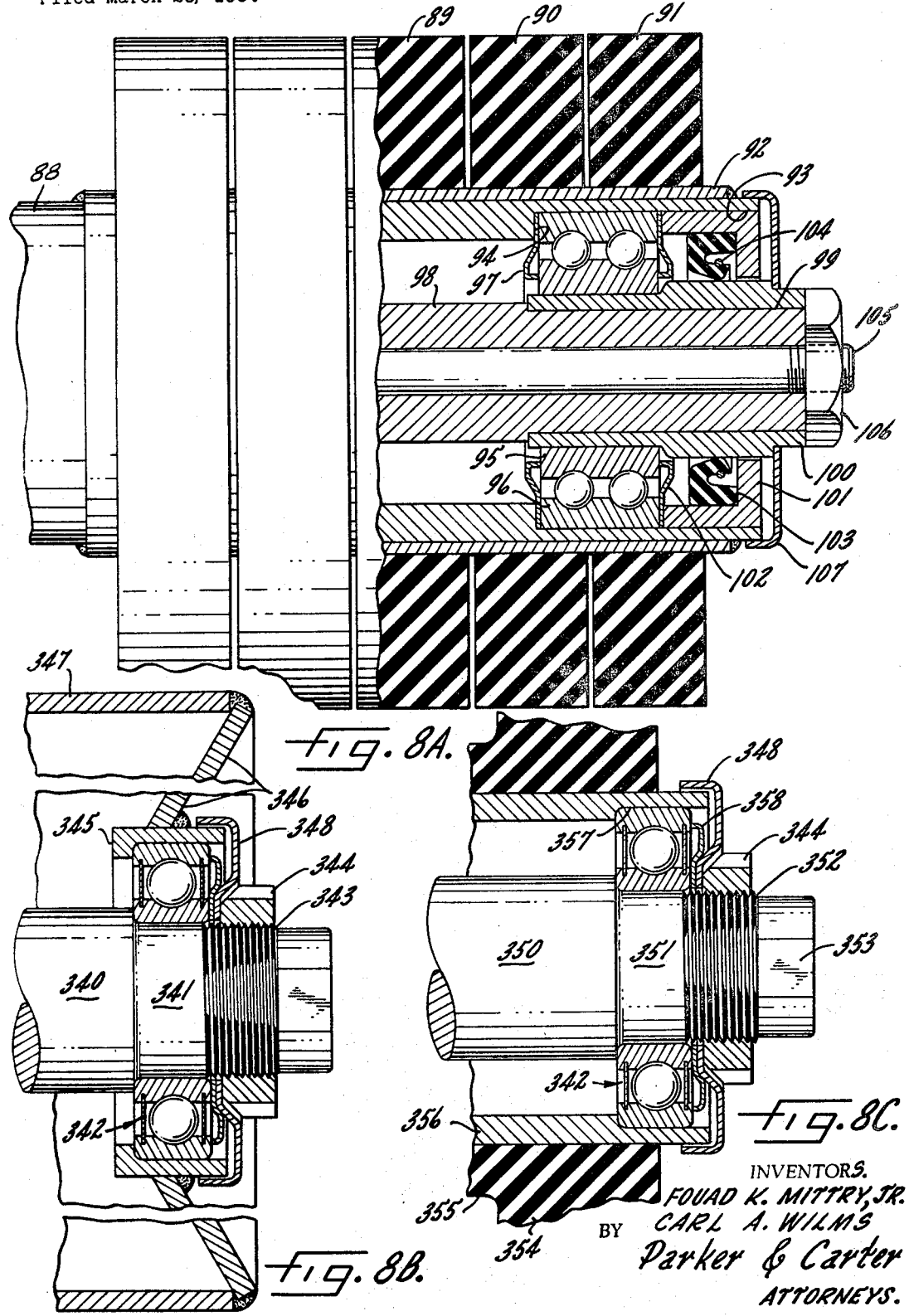

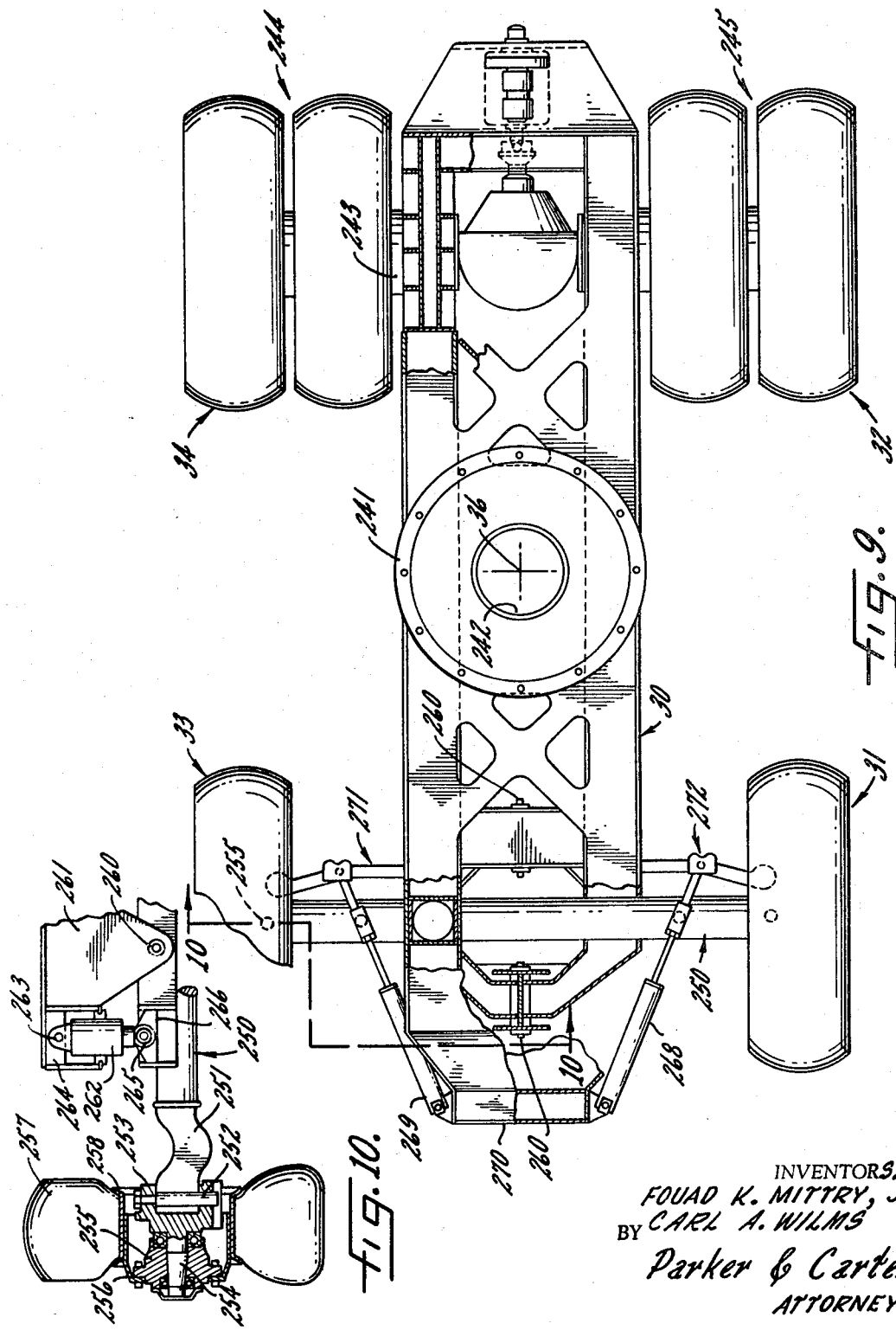

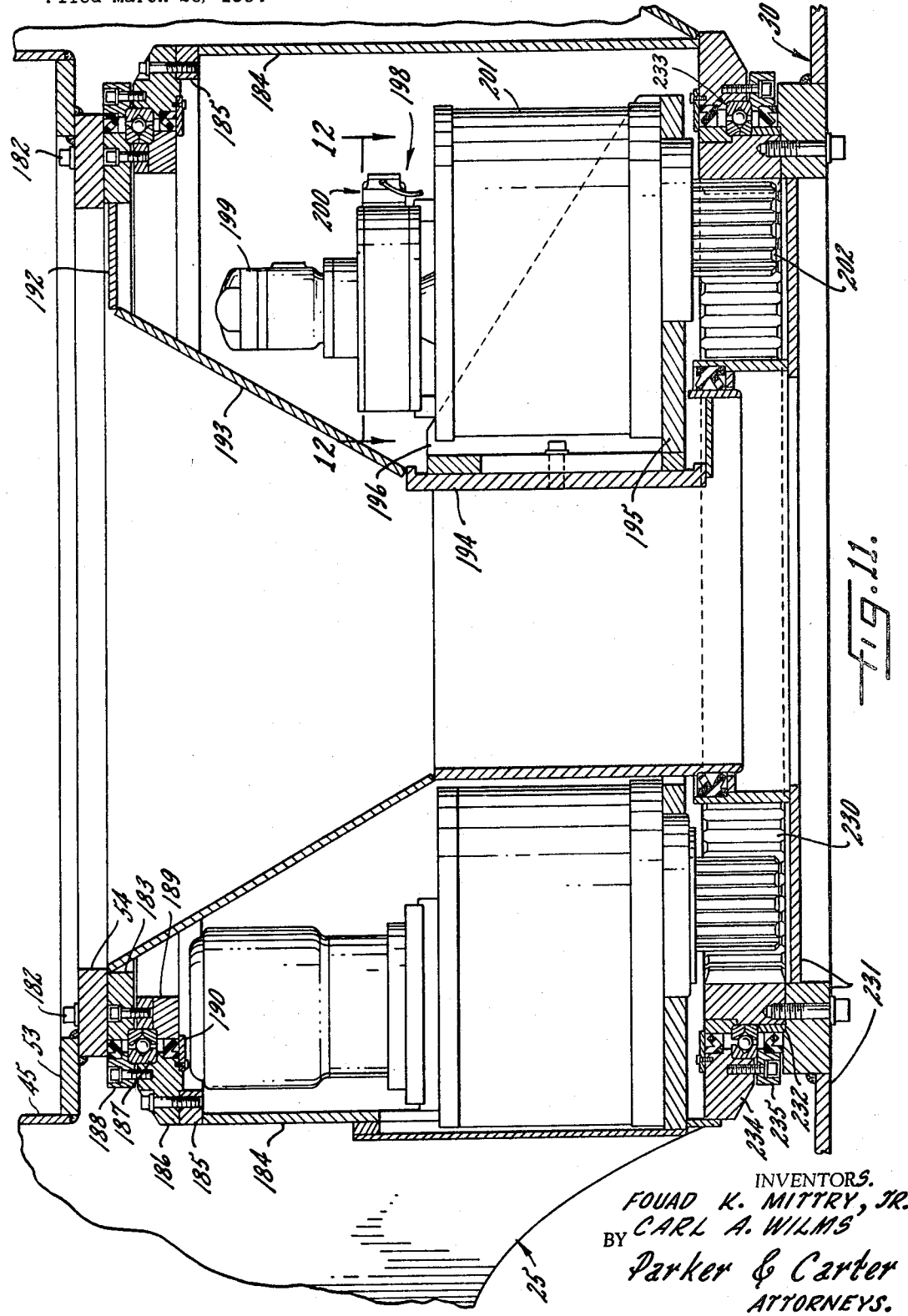

INVENTORS.
FOUAD K. MITTRY, JR.
CARL A. WILMS
BY Parker & Carter
ATTORNEYS.

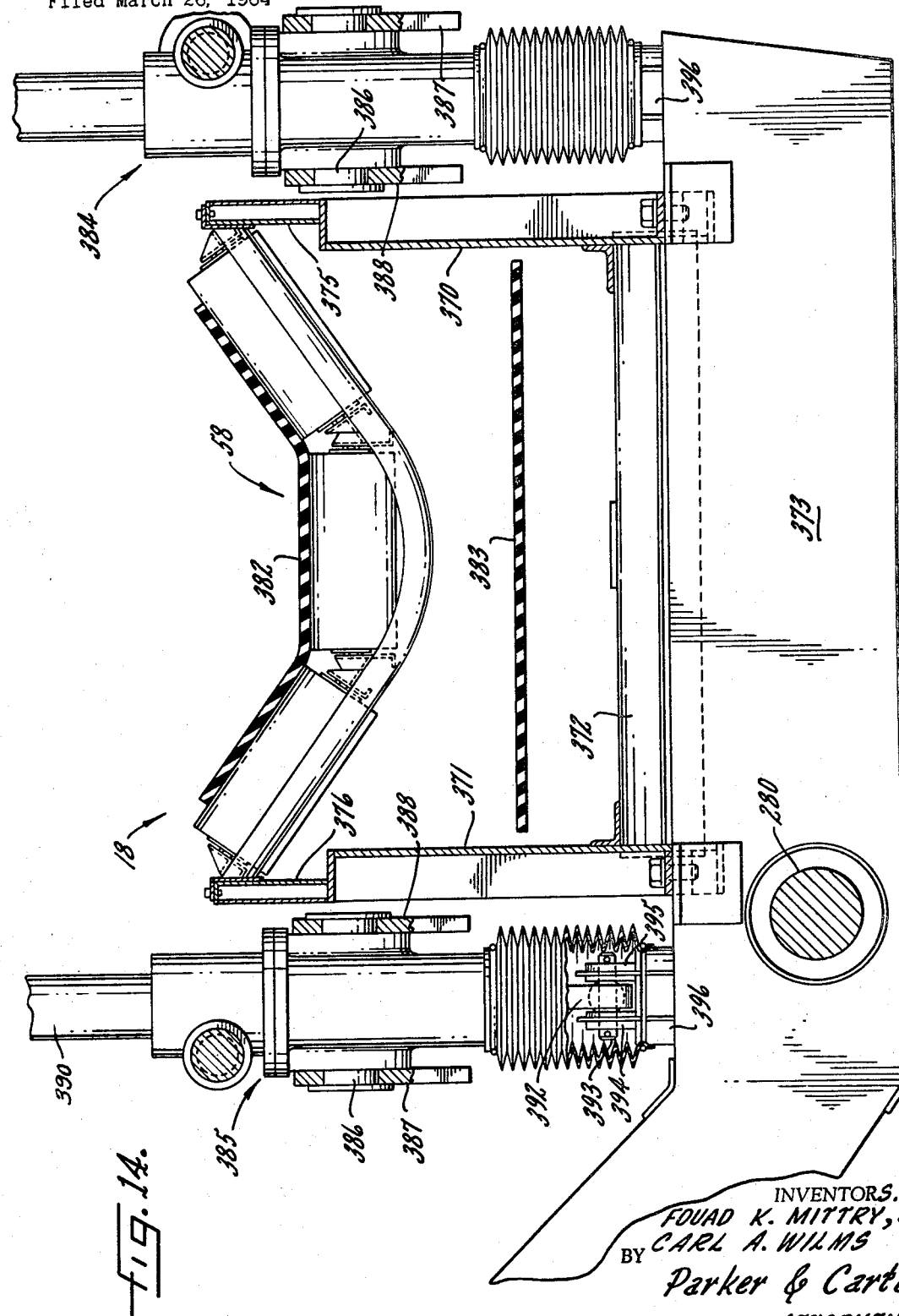

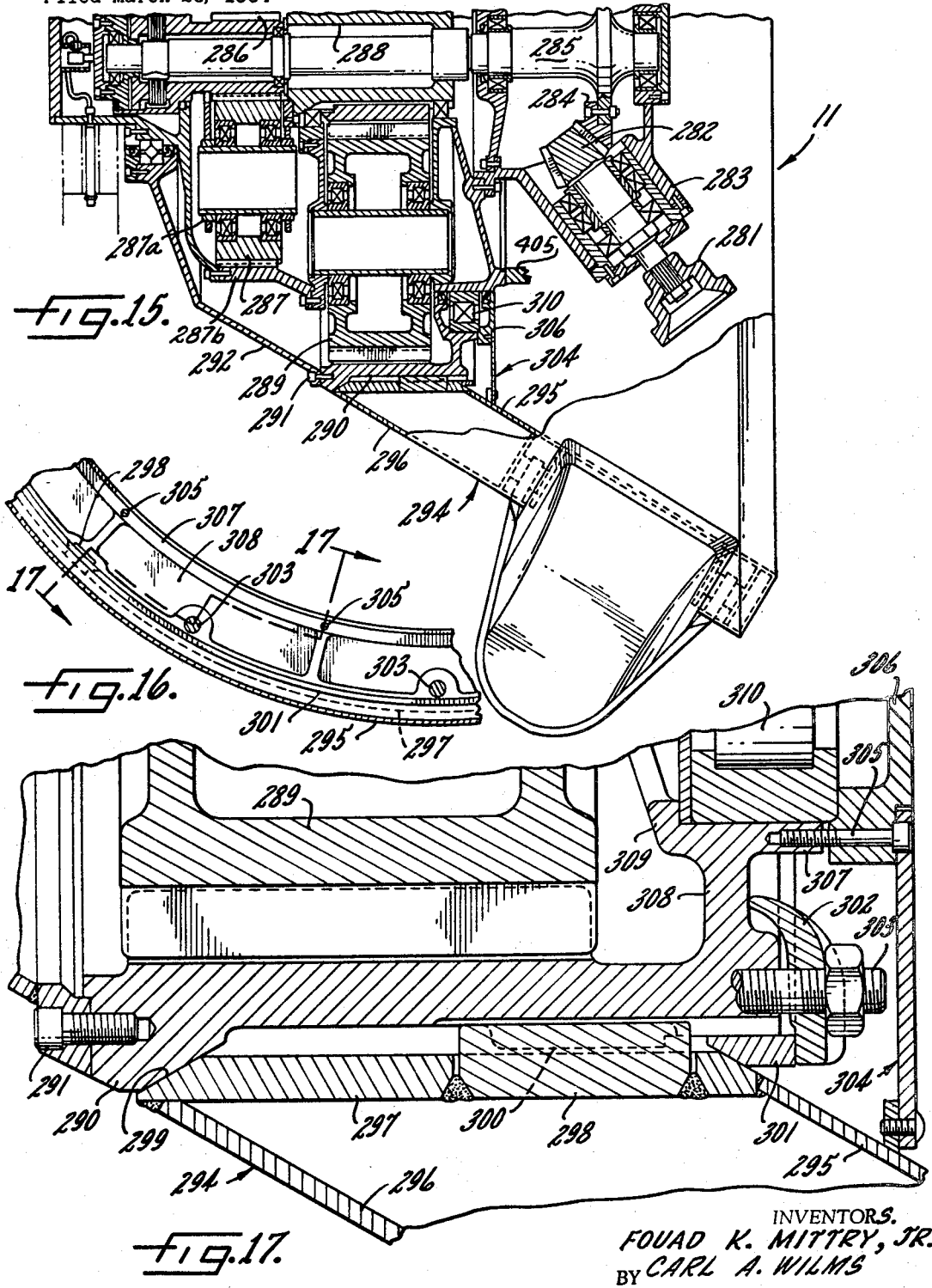

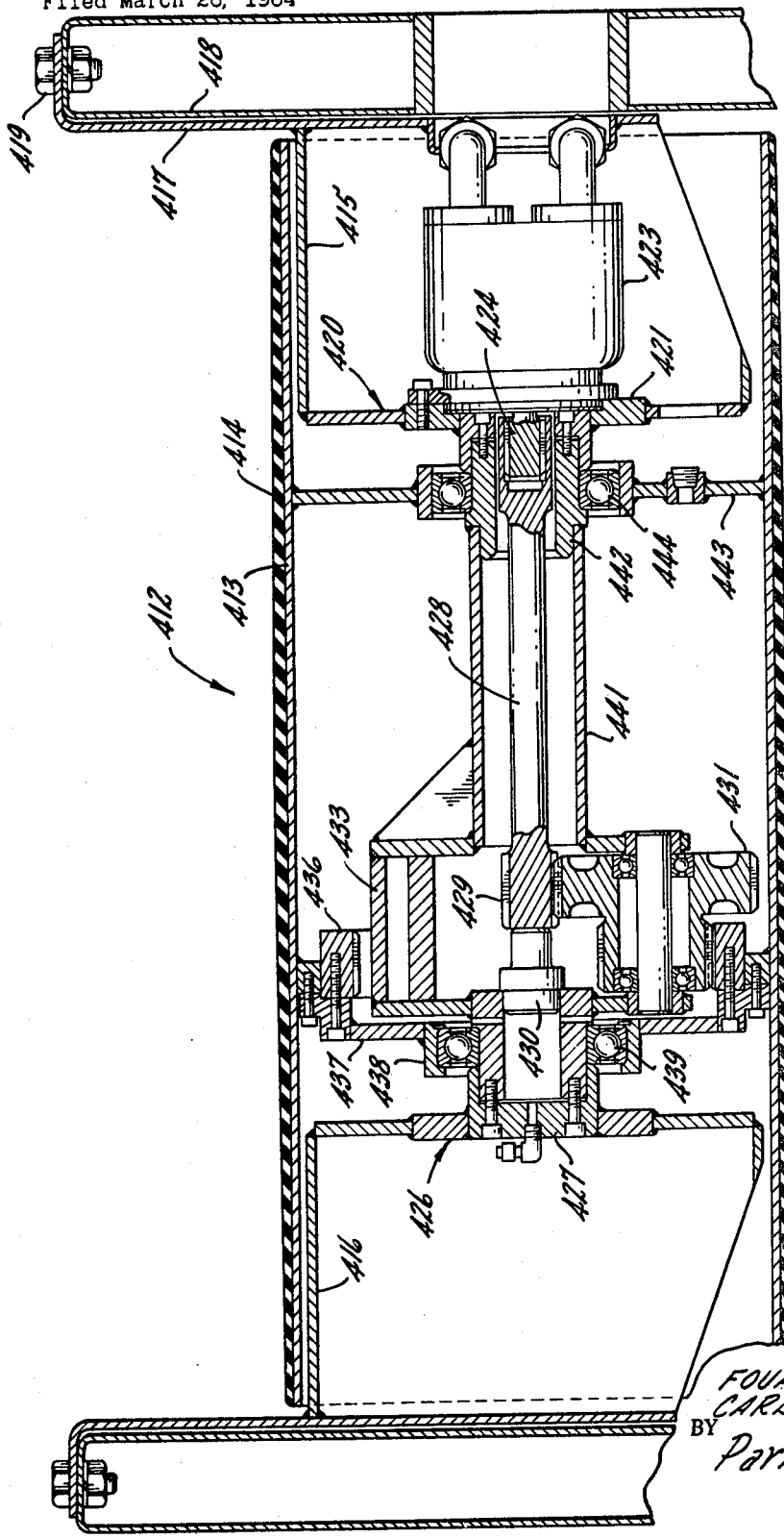

3,390,473
PORTABLE WHEEL EXCAVATOR AND METHOD OF EXCAVATING

Carl A. Wilms, La Habra, and Fouad K. Mittry, Jr., Los Angeles, Calif., assignors to Mechanical Excavators, Inc., Los Angeles, Calif., a corporation of California
Continuation-in-part of application Ser. No. 177,422, Mar. 5, 1962. This application Mar. 26, 1964, Ser. No. 354,831
18 Claims. (Cl. 37—190)

This application is a continuation-in-art of copending application 177,422, filed Mar. 5, 1962, now abandoned.

This invention relates generally to wheel excavators and particularly to a self-propelled tire mounted wheel excavator and components especially adapted for use therewith.

Accordingly, a primary object of the invention is to provide a self-propelled wheel excavator which may be either rubber tire or crawler mounted, the basic design being capable of reproduction in a wide range of sizes, each size having an extremely high, and extremely efficient, digging capacity.

Another object is to provide a wheel excavator so weighted as to allow a full 180 degree swing of the wheel during digging.

Yet a further object is to provide a wheel excavator of extreme simplicity for its capacity as contrasted to existing machines, the wheel excavator using only one engine to power the several different and quite independent power consuming units of the excavator.

Another object is to provide a wheel excavator having a simplified propel drive arrangement, the propel drive system including an hydraulic motor which can be easily controlled by valves in the operator's cab to either swing the wheel during digging, or propel the excavator.

Yet another object is to provide a wheel excavator in which the excavated material does not appreciably change directions as it is excavated, thereby permitting the use of high peripheral wheel speeds to attain a yardage production which approaches conventional wheels of roughly twice the diameter.

Yet a further object is to provide a wheel excavator in which the discharge of the buckets does not depend entirely upon rotation of the excavator wheel, thereby allowing full use of gravity in the discharge of the excavated material from the wheel buckets.

Another object is to provide a wheel excavator in which the buckets may discharge as they are still cutting so that actual output per revolution may be greater than the product of bucket discharges times bucket size.

A further object is to provide a wheel excavator in which the components, in operation, are not subjected to reciprocal motions and therefore fatigue and inertia forces such as exist in plugging the swing in conventional machines are substantially eliminated.

Yet a further object is to provide a wheel excavator in which the digging height of the wheel can be very accurately adjusted by means of an hydraulic motor driving a pair of screw jacks.

Another object is to provide a wheel excavator having a steering axle which is pivoted at its center for three point suspension during the propel cycle, but when digging or in the swing cycle may be locked up to provide stability over all four wheels.

Yet a further object is to provide a wheel excavator having a discharge conveyor which can be positioned independently of the wheel and ladder by an hydraulically driven gear box working against a stationary ring gear on the truck, the ring gear performing the dual function of serving as a reaction for the hydraulically driven swing gear drive and as a positioning device.

Another object is to provide a conveyor especially adapted for the rugged, high speed service conditions of a wheel excavator, the conveyor consisting, in part, of a unique tubular framework construction having an overhung skirt board design.

Another object is to provide a conveyor especially adapted for a wheel excavator having a wheel or conveyor ladder and a discharge conveyor, both of which are so arranged that they may be bodily removed from the machine by merely loosening a few bolts whereby belting can be quickly and efficiently removed and replaced as necessary.

A further object is to provide a conveyor roll especially adapted for use in the dusty and abrasive environment of a wheel excavator, the conveyor roll having several separate areas at the bearing and being capable of providing trouble-free performance for greater periods of time than rolls presently available on the market.

Another object is to provide a light weight, easily manipulated conveyor drive pulley assembly especially adapted for use in a wheel excavator, the drive pulley assembly being insertable and removable as a unit, and having the ruggedness of conventional assemblies of substantially greater weight.

A further object is to provide a discharge conveyor assembly for a wheel excavator having a unique spring set and air released brake on the positioning drive assembly which is automatically disengaged when the fluid motor which powers the discharge conveyor is operated, and which is engaged to hold the conveyor in position when the fluid motor stops.

Yet another object is to provide a unique mode of securely fastening a ring gear to a wheel rim in such a manner that the ring gear will be tightly clamped yet easily removable by use by use of a few simple tools.

Yet a further object is to provide an excavating bucket having a unique variable area non-planar maw, the bucket being especially adapted to use in a screw in type mode of digging.

A further object is to provide a bucket tooth adaptor especially adapted for use with the aforesaid non-planar bucket maw.

A further object is to provide a wheel excavator having a wheel conveyor and a discharge conveyor so disposed that their meeting ends overlie one another in all relative positions of one to the other, the area of overlap being disposed above a hollow center tube through which excavated material may fall if for some reason all the material should not be transferred from one conveyor to the other.

Yet a further object is to provide a wheel excavator having a wheel support which is offset with respect to the line of sight between the operator's station and the digging area to thereby provide an unobstructed view of the digging area to the operator.

Yet a further object is to provide a wheel excavator in which the ladder conveyor frame and the ladder are formed as a single unit, and the discharge conveyor frame and discharge conveyor support structure are formed as another unit.

Another object is to provide a wheel excavator having lightweight conveyor idler assemblies so that in assembly or disassembly of the conveyor the belt is placed in the frame, the individual pulley and idler assemblies placed inside the belt, and then the resultant combination quickly adjusted.

Yet a further object is to provide a wheel excavator having a discharge conveyor which is hinged intermediate its ends so that the over-all height of the wheel excavator may be drastically reduced for road travel or ground level maintenance, the hinged structure being very simple to operate and the conveyor being erectable or collapsable in a very short time.

Yet a further object is to provide a conveyor having a skirt board which may be quickly and easily attached to and removed from the conveyor frame by means of a unique bullet-nosed type of connection.

Another object is to provide a wheel excavator having an engine mounted on an upper rotating base, the engine weight and a counterweight balancing the overhung wheel load, said excavator having only the single engine for all functions, suitable for conventional machines of equivalent capacity for which a plurality of inventions had heretofore been required.

Yet another object is to provide an excavator wheel in which carryover of material is substantially entirely eliminated even though the wheel is capable of relatively rapid rotation, for example on the order of 12 r.p.m. or higher, and actual production capacity of the wheel is far greater than conventional wheels of equal diameter.

A further object is to provide a method of excavating in which excavated material is transferred to material removal means with substantially no impact, whereby initial and maintenance costs and complexity of the system is materially reduced over present, high impact type excavating methods.

Another object is to provide a method of excavating in which material is admitted simultaneously to and discharged from a receptacle of relatively constant volume capacity whereby more material may be excavated by the receptacle than its nominal volume in one excavating pass.

Other objects and advantages of the invention will become apparent from a reading of the following description of the invention.

The invention is illustrated more or less diagrammatically in the accompanying drawings wherein:

FIGURE 1 is a front view of a rubber tire mounted version of the wheel excavator;

FIGURES 2A and 2B, when taken together, are a side view of the excavator, the operating condition of the wheel excavator being shown in solid line and the travel and maintenance condition of the machine being shown in dotted lines;

FIGURE 8A is a partial, detail view of one of the conveyor rolls used in the wheel excavators.

FIGURE 8B is a detail view of a bearing assembly for a conveyor roll;

FIGURE 8C is a detail view of another bearing assembly usable in a conveyor roll;

FIGURE 9 is a partial top plan detail view of the truck frame portion of the excavator;

FIGURE 10 is a detail view, to the same scale of FIGURE 9, taken substantially along the line 10—10 of FIGURE 9;

FIGURE 11 is a sectional view of the wheel swing and discharge conveyor positioning structure;

FIGURE 14 is a sectional view taken substantially along the line 14—14 of FIGURE 4 through the wheel ladder structure;

FIGURE 15 is a detail, partial sectional view with parts omitted, parts broken away, and other parts shown in outline for purposes of clarity of the drive system for the cone-shaped bucket wheel;

FIGURE 16 is a detail view of the connecting rim structure for the cone wheel frame;

FIGURE 17 is a detail view taken substantially along the line 17—17 of FIGURE 16 illustrating the novel mode of connection of the cone-shaped wheel frame to the wheel gearing support structures;

FIGURE 22 is a sectional view through a conveyor drive pulley assembly.

Like reference numerals will be used to refer to like or similar parts throughout the following description of the drawings.

General assembly

Figure 1:
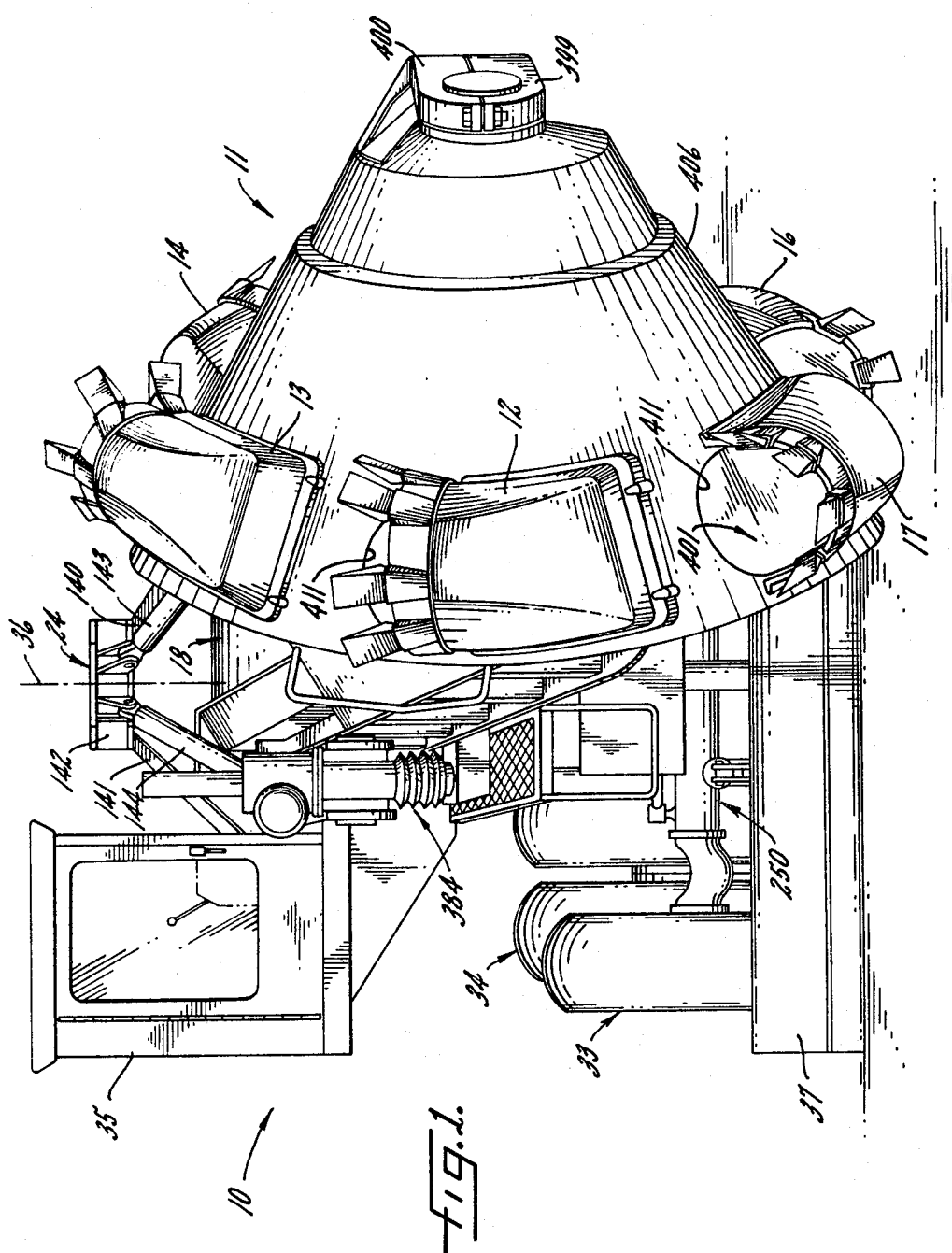
Figure 2:
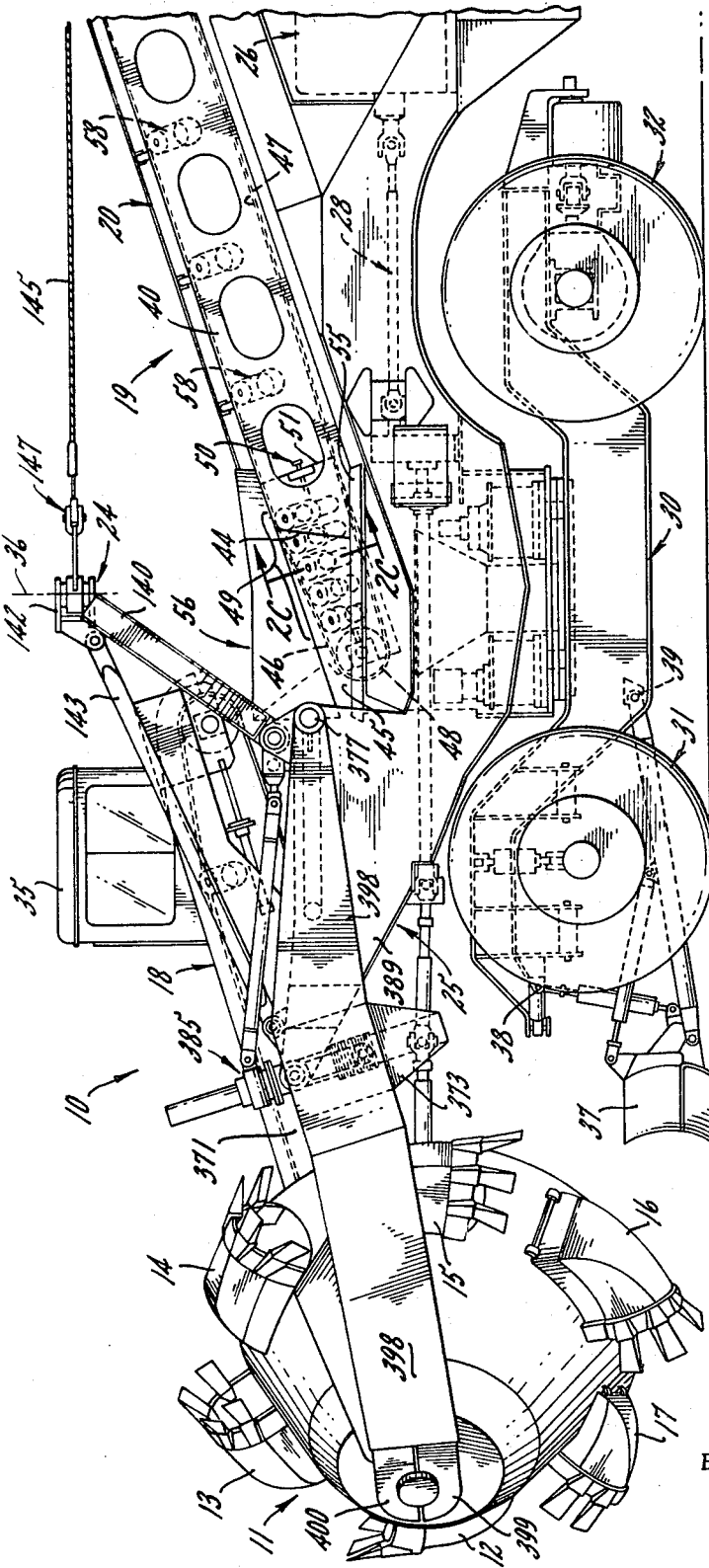
FIGURE 2C is a section view taken substantially along the line 2C—2C of FIGURE 2A.

The machine is indicated generally at 10 in FIGURES 1, 2A and 2B. A cone-shaped excavator wheel is indicated generally at 11. A plurality of buckets 12, 13, 14, 15, 16 and 17 are equidistantly spaced about the wheel in the vicinity of its greatest periphery. The buckets discharge onto a ladder or wheel conveyor 18 which in turn dumps into a discharge conveyor 19. The discharge conveyor consists of an inner or forward section 20 and an outer or rearward section 21, the sections being connected to one another for articulatable movement by a hinge structure indicated generally at 22. Material conveyed by the discharge conveyor empties into a discharge chute assembly indicated generally at 23. The forward end of the discharge conveyor is supported, at its outer end, by a gantry assembly indicated generally at 24.

The wheel and wheel ladder assembly and the discharge conveyor are mounted on a rotating base indicated generally at 25. An internal combustion engine, indicated generally at 26, is mounted on the rotating base for supplying power to all of the operating parts of the excavator. A counterweight is indicated at 27, the function of the engine and counterweight being to counter-balance the wheel 11. A wheel drive system indicated generally at 28, which will be described in more detail hereafter, is mounted in suitable bearing structures carried by the rotating base 25, the engine 26 directly driving wheel 11.

The rotating base in turn is rotatably mounted with respect to the truck frame 30. Truck frame 30 is mounted on four sets of wheel assemblies 31, 32, 33 and 34. See also FIGURE 9. Each wheel assembly may consist of 1, 2 or more wheels, the number used depending to a large extent upon the capacity and intended use of the excavator. Furthermore, it is contemplated that the excavator may be crawler mounted, rather than tire mounted, as shown in FIGURES 1, 2A and 2B. The same basic design principles may be employed whether the excavator be tire or crawler mounted, although it will generally be more expeditious to employ the crawler mounting on the larger size excavator in order to take advantage of the greater area of weight distribution provided by the crawler treads.

An operator's cab is indicated at 35. As best seen in FIGURE 1 the operator's station or cab is offset from the ladder conveyor 18 but placed forwardly of the center vertical axis 36 in a position close to the digging wheel so that the operator is provided with an unobstructed view of the wheel at the digging area.

A V-type blade 37 is pivotally connected to the truck frame as at 38 and 39 to prevent rocks from getting under the wheels which disturbs the level of the machine.

*Discharge conveyor*

Figure 7:
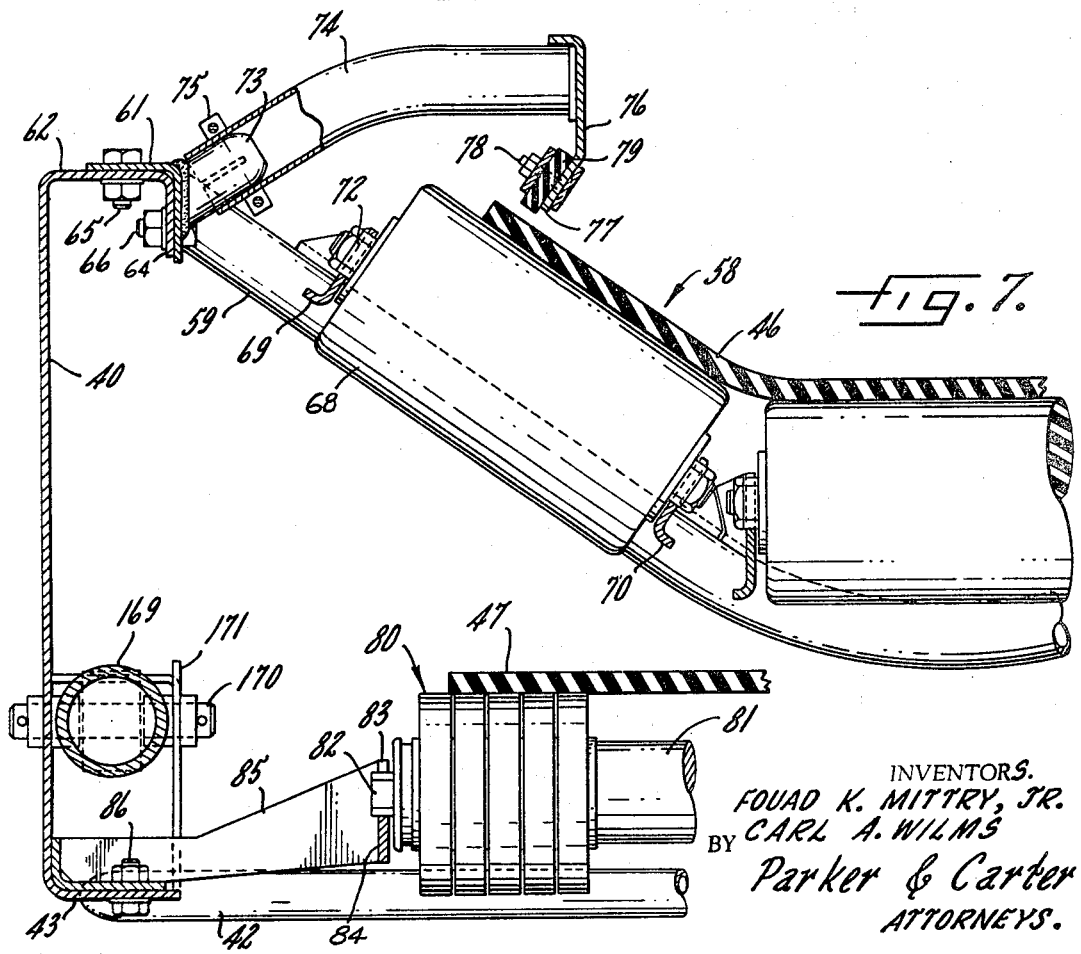
FIGURE 7 is a partial sectional view through the discharge conveyor taken substantially along the line 7—7 of FIGURE 3A.

Lower section 20 of the discharge conveyor consists of a pair of side members 40 and 41 each of which is formed roughly as a hollow wall as shown best in FIGURE 7.

One or a plurality of tubular cross braces 42 maintain the bottoms of the side members a fixed distance apart. The terminal ends of the individual tubular members comprising each cross brace member 42 are bullet-shaped and have a slot formed therein to receive the lower flange 43 of the box-like side members 40 and 41. This detail is best illustrated in FIGURE 7.

The lower ends of the side members 40 and 41 are welded at 44 to a circular plate member 45. Circular plate member 45 is itself cut away roughly along weld line 44 to provide access to the conveying and return reaches 46, 47, and to the tail pulley 48 which is mounted within the circular member 45. A plurality of impact idlers 49 are closely spaced to tail pulley 48 in the area of impact of material delivered from the head end of the ladder belt conveyor. The tail pulley 48 may be longitudinally moved along the conveyor by means of the take-up mechanism indicated generally at 50, the take-up mechanism being associated with an interior wall 51 which forms the inner surface of the rear end of side member 40.

The lower circumferential edge of circular plate 45 is welded to a ring 53 which in turn is welded to a circular bar 54, best shown in FIGURE 11. The mode for rotating the discharge conveyor with respect to the rotating base will be described in detail in connection with FIGURE 11. A dirt deflecting skirt is indcated at 55 and a hopper which is welded to the upper edge of the circular member 45 is indicated generally at 56.

One of the impact roller assemblies 49 is shown in FIGURE 2C. Although this figure is a view of one of the impact roller assemblies in the discharge conveyor, it may be representative as well of an impact roller assembly in the ladder conveyor. Actual experience has indicated that because of the lack of any substantial impact onto the ladder conveyor, conventional steel shell rollers may be used, thus materially reducing the cost and complexity of the roller assemblies at the loading end of the conveyor.

The sides of the conveyor consist of a pair of plate members 40 and 360 whose upper ends are bent toward one another and secured together to form a rugged frame. The rolls 361 and 362 are supported by dead shafts 363 and 364, the ends of which are received in brackets 365 and 366. The brackets are welded or otherwise suitably secured to framing 367 which is welded at its ends to side wall 360. In this instance the end bracket 366 has been formed by a tab cut-out from wall 360. The lower half of framing 367 is apertured to receive a take-up screw 368 which extends from one end of the plurality of impact roller assemblies to the other, the screw being part of a take-up assembly which imparts tension to the conveyor belt.

It will be noted that in the wheel conveyor the impact roller assemblies are placed as close to the tail pulley as possible and the tail pulley in turn is located closely adjacent the bucket rim (see also FIGURE 4), and at a level such that material is discharged through the bottomless bucket onto the conveyor belt at a time when the bucket teeth are still biting into unexcavated material. This unique arrangement of wheel-bucket-conveyor makes the bucket a mere funnel for excavated material during a portion of the time it is in engagement with the unexcavated material so that the physical size and configuration of the bucket as a capacity limiting factor is reduced. This arrangement enables surprisingly high digging efficiencies to be achieved, the efficiencies already reached in actual use being almost 85% of the theoretical capacity as contrasted to the industry established standard of 50% of theoretical capacity.

A plurality of conveyor idlers 58 are spaced at substantially regular intervals along the conveyor. The conveyor idler assemblies are illustrated best in FIGURE 7.

Referring to that figure, it will be noted that each conveyor idler assembly includes a pair of tubular bars 59 and 60, each of which is welded at its outer end to an L-shaped channel 61. The L-shaped channel in turn is bolted to the tops 62, 63 of side members 40 and 41 respectively and to the downturned flange portions 64 of the side members. Bolts 65 and 66 are shown best in FIGURE 7.

Pairs of spacer members extend between the tubular bars 59, 60 to provide support for the individual conveyor rolls. For example referring to FIGURE 7, the pair of cross links or brackets for wing or end roller 68 are indicated at 69 and 70. The brackets 69, 70 are cut to fit over the tubular bars 59, 60 and to be secured thereto by welding or other suitable securing means. The brackets are apertured at their mid-points to receive the roller shaft indicated at 72.

A plurality of bullet-shaped mounting stubs or anchor members 73 are welded at their inner ends to the L-shaped channel 61 from one end to the other. In this instance one anchor member is located approximately midway between each pair of tubular bars 59 and 60. An angled, tubular stanchion whose internal diameter is equal to or only slightly greater than the external of the mounting stub 73 is indicated at 74. The inner ends of the mounting stanchions may be slotted to facilitate their placement over the mounting stubs 73. Collars or other suitable securing means 75 securely, but removably, clamp the stanchions to the mounting stubs. A skirt board 76 is welded or otherwise suitably secured to the outer end of each stanchion 74, the lower edge of the stanchion being slightly outwardly bent as at 77 so as to be disposed substantially perpendicularly to that portion of the conveying reach 46 of the belt located immediately below it. The skirt board has secured thereto as by screw 78 a skirt 79 which acts as a barrier against spillage of excavated material over the edges of the belt.

It will thus be seen that skirt board 76 can be removed and attached as a unit to the balance of the assembly or, likewise, the conveyor framework which consists of the L-shaped channel 61 and the plurality of pairs of tubular frames 59, 60 can be removed and replaced bodily from the side members 40 and 41 with or without skirt boards being secured thereto.

The return reach 47 of the conveyor belt is supported at the outer or upper end of lower conveyor section 20 by a return idler indicated generally at 80. The idler consists essentially of a tubular center piece 81 which extends from end to end of the assembly, each end of the piece 81 terminating in a stub shaft 82.

The vertical sides of the non-rotatable stub shaft may have flats milled thereon, the milled flats being slidably received in an aperture 83 cut in the end plate 84 of a mounting bracket 85, the outer end of which is bolted as at 86 to the lower flange 43 of side member 40.

The details of the return idler are shown best in FIGURE 8A. The idler consists essentially of a roller support tube 88 to which a plurality of rubber rings or rollers 89, 90 and 91 are bonded. The rubber rings are bonded to a thin ring or collar 92 which slips over and is welded to the exterior surface of roller support tube 88. The outer end of roller support tube 88 is recessed as at 93 so that a shoulder 94 is formed a slight distance inwardly from the terminal end of the tube. A bearing structure, in this instance an annular double ball-bearing having an inner race 95 and an outer race 96, is received in the recess and butted against the shoulder 94. A grease seal is indicated at 97 interposed between the face of the shoulder and the edge of the outer race 96. An internal shaft is indicated at 98, the outer end of which is reduced as at 99 to receive a sleeve bushing 100 which functions as a bearing shaft. Its inner end is reduced to a diameter such that it will be received within the internal diameter of the bearing. The outer bearing race 96 is maintained in position by a bearing retainer 101, the inwardly extending flange portion of which bears against a second grease seal 102 and the outer bearing race. A wiper seal is indicated at 103. The pressure of the wiper seal against the exterior diameter of bearing shaft 100 is adjusted by a tightening wire 104. Tie rod 105 extends through the internal shaft 98. The tie rod is threaded at each end and a tightening nut 106 presses the sleeve bushing 100 into position. A cup seal is indicated at 107.

One end of a typical roll assembly for a conveyor idler is shown in FIGURE 8B. A center shaft is indicated at 340. Its end is reduced at 341 to receive a ball bearing 342, and threaded at 343 to receive a locknut 344. The bearing is held by a retainer 345 which is welded to end wall 346, the end wall in turn being welded to shell 347. A dirt cup is indicated at 348.

One end of a typical impact roll assembly 49 is shown in FIGURE 8C. The shaft 350 is reduced at 351 to receive a bearing 342 and threaded at 352 to receive locknut 344.

Flats 353 are milled on the sides of the shaft to hold the shaft stationary when inserted in slots 83 in the supporting bracket. The impact roller, which preferably is a plurality of rubber rings 354 spaced from but connected to one another by connecting portions 355, are bonded to the roller shell 356. The ends of the shell are recessed at 357 to receive the bearing 342. Grease seal ring 358 and cup 348 complete the assembly.

The head or discharge section 21 of conveyor 19 is similar in construction to the tail section 20. The head section includes a pair of side members 110, 111, which are rigidly spaced from one another by a cross-brace structure 112 similar to cross brace structure 42. A second brace structure is indicated at 113 close to the head or discharge end of the conveyor.

Figure 5:
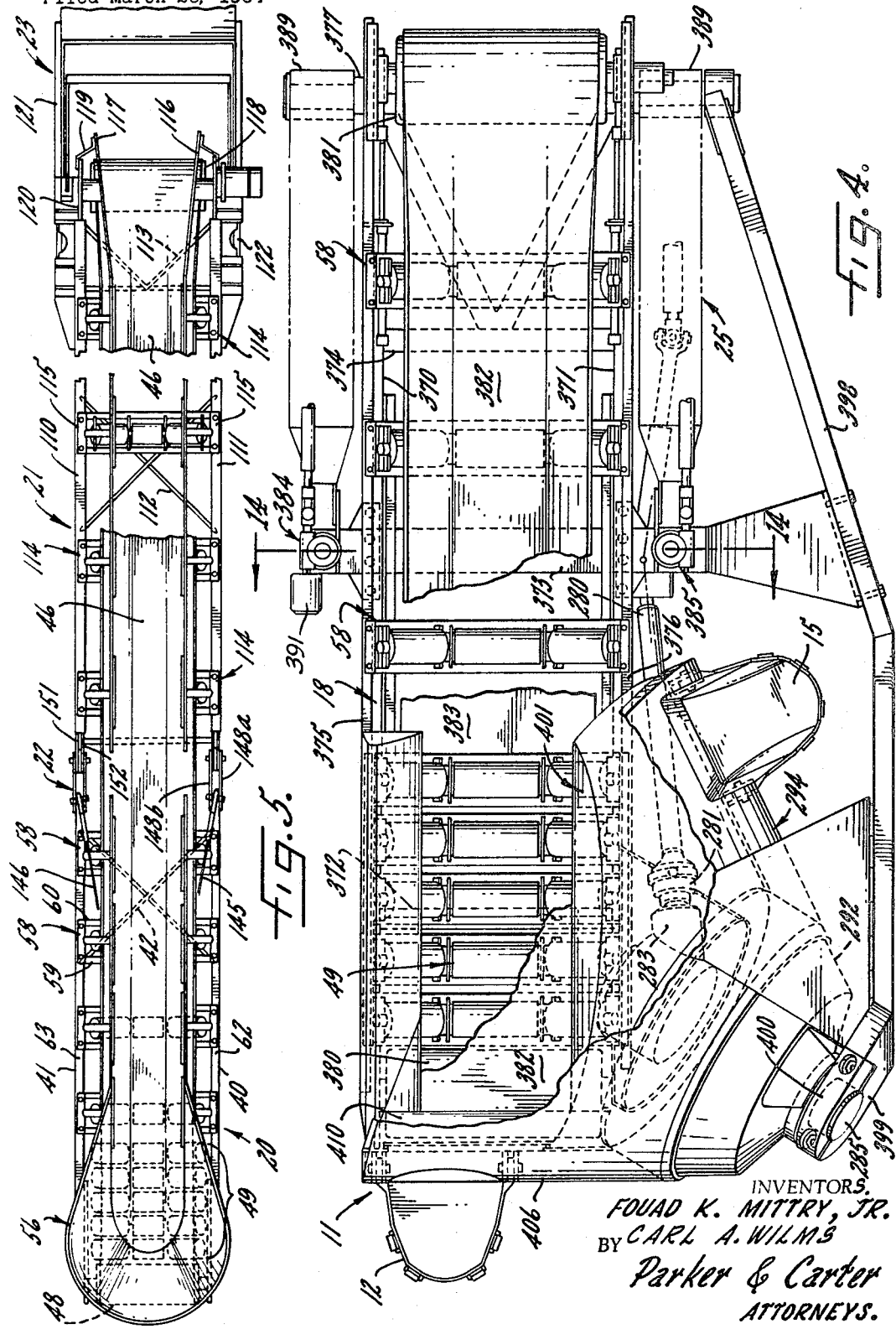
FIGURE 5 is a top plan view, with parts omitted, of the discharge conveyor.
Figure 6:
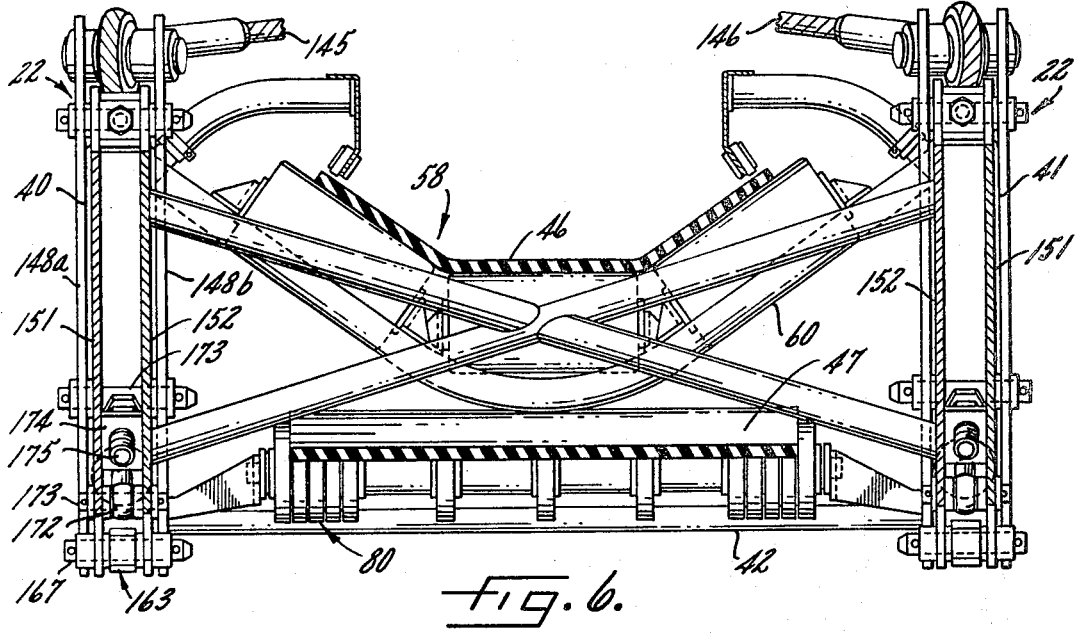
FIGURE 6 is a section through the discharge conveyor taken substantially along the line 6—6 of FIGURE 3A.

A plurality of conveyor assemblies are indicated at 114. These conveyor assemblies are similar in all important respects to the conveyor assemblies in the tail or lower section of the conveyor. As best seen in FIGURE 5, each conveyor assembly includes a pair of wing rollers flanking a center roller, the rollers being suspended by brackets between a pair of bent tubes which are welded to short flanges 115 which in turn are bolted to the top sides of the side members 110 and 111 in a manner substantially identical to the construction shown in FIGURE 7. In this instance the head ends of the skirt board structures flare outwardly as at 116, 117 and are practically co-extensive with the ends of the head or discharge pulley 118 at their furthest extremity. The flared portions of the skirt members are secured as by bracket members 119 to extensions 120 which in turn are securely fastened to the side members 110 and 111 by any suitable means.

A framework consisting of a pair of generally parallel downwardly and outwardly extending members 121 and 122 which are connected at their outer extremities by cross member 123 (see FIGURE 2B) support a pair of discharge chutes 124 and 125. The chutes may be rubber-lined but since their particular mode of construction is not an essential part of the invention they are not further illustrated or described.

A deflector cylinder is indicated at 126. The inner end of the cylinder is pivotally mounted as at 127 to a framework 128 secured to members 122 and 121. The piston rod 129 of the cylinder is pivotally connected to a sector-shaped deflecting hood 130 which is movable from the dotted to the solid line position of FIGURE 2B. The chute is pivoted as at 131. When in the dotted line position the hood deflects material projected over the end of the conveying reach 46 of the conveyor belt into chute 124. When the deflecting hood 130 is in the solid line illustrated position, the material is deflected into the near chute 125.

Any suitable mechanism for causing extension and retraction of the piston rod may be employed. A very suitable mechanism is the radio control system illustrated and described in copending application Ser. No. 177,422, which may be under the control of a truck operator. Alternately, the two-way discharge chute can be eliminated entirely and a single chute provided which empties into a conveyor system. The two-way chute provides great versatility, particularly in locations in which rapid advancements are made, but each discharge system has its own particular advantages and which system will be employed will depend largely on the operational requirements.

An electric motor 132 which is powered from any suitable source of current such as a generator turned by the engine 26 drives the discharge conveyor.

Gantry structure

The lower or tail end 20 of the discharge conveyor is supported from rotating base 25 by the gantry structure illustrated best in FIGURES 2A, 2B, 3A and 6.

A pair of gantry members 140, 141 are pivotally connected at their lower ends to a pair of pivot points on the rotating base 25, one on each side thereof. The gantry members extend upwardly to a gantry pivot housing assembly 142. A pair of gantry support struts 143, 144 are pivotally connected at their lower ends to the rotating base assembly, one at each side thereof, and at their upper ends to pivot means carried by the gantry housing assembly. A pair of suspension cables 145, 146 are connected, at their forward ends, to the gantry pivot housing 142 by a suspension cable assembly 147 and, at their trailing ends to the plate ends of the lower section 20 of the discharge conveyor. Since the connection of the right end of each of the suspension cables to the lower section of the discharge conveyor is the same, only one will be described in detail.

Hinge assembly

Referring now particularly to FIGURES 2B, 3A, 5 and 6, it will be noted that right side member 40 has welded thereto at its ends, and on either side thereof, a pair of heavy, triangularly shaped plates 148a and 148b. The right end of suspension cable 145 has a loop formed therein, and a pin 149 which is received in a pair of collars passes through the loop, one collar being carried by each side plate. Suitable cotter pins prevent unintended longitudinal movement of pin 149.

The right terminus of the plates has a pair of axially aligned holes formed therein for reception of a connecting pin 150 which will be described in detail hereinafter. The lowermost point of each of the side plates also has a pair of axially aligned holes formed therein for the reception of a pin which will be described hereinafter.

A second set of roughly triangularly shaped plates 151, 152 are welded to the tail or left end of right conveyor section 21. In this instance the triangular hinge plates 151, 152 have a projecting portion 153 which is received within the side member 110 as best seen in FIGURE 3A.

A pair of axially aligned holes are formed in hinge plates 151, 152 near their upper end. A pair of slideways 154, 155 are welded between hinge plates 151 and 152. The passage formed by the slideways and hinge plates is closed at each end by a pair of end plates 156, 157, each of which has a threaded central hole therein. A pair of threaded bolts are indicated at 158 and 159, the lead end of the bolts butting against a block 160 received between the side plates 154 and 155. The hinge pin 150 passes through aligned apertures in the lower section hinge plates 148a, 148b, the upper section hinge plates 151, 152, and the adjusting block 160. Hinge plates 151, 152 are slotted as at 161 for example so that the position of the block 160, and thereby the positions of the two sections 20 and 21 of the conveyor, may be changed. In the FIGURE 3B position the conveyor sections are extended to their maximum length.

Figure 3:
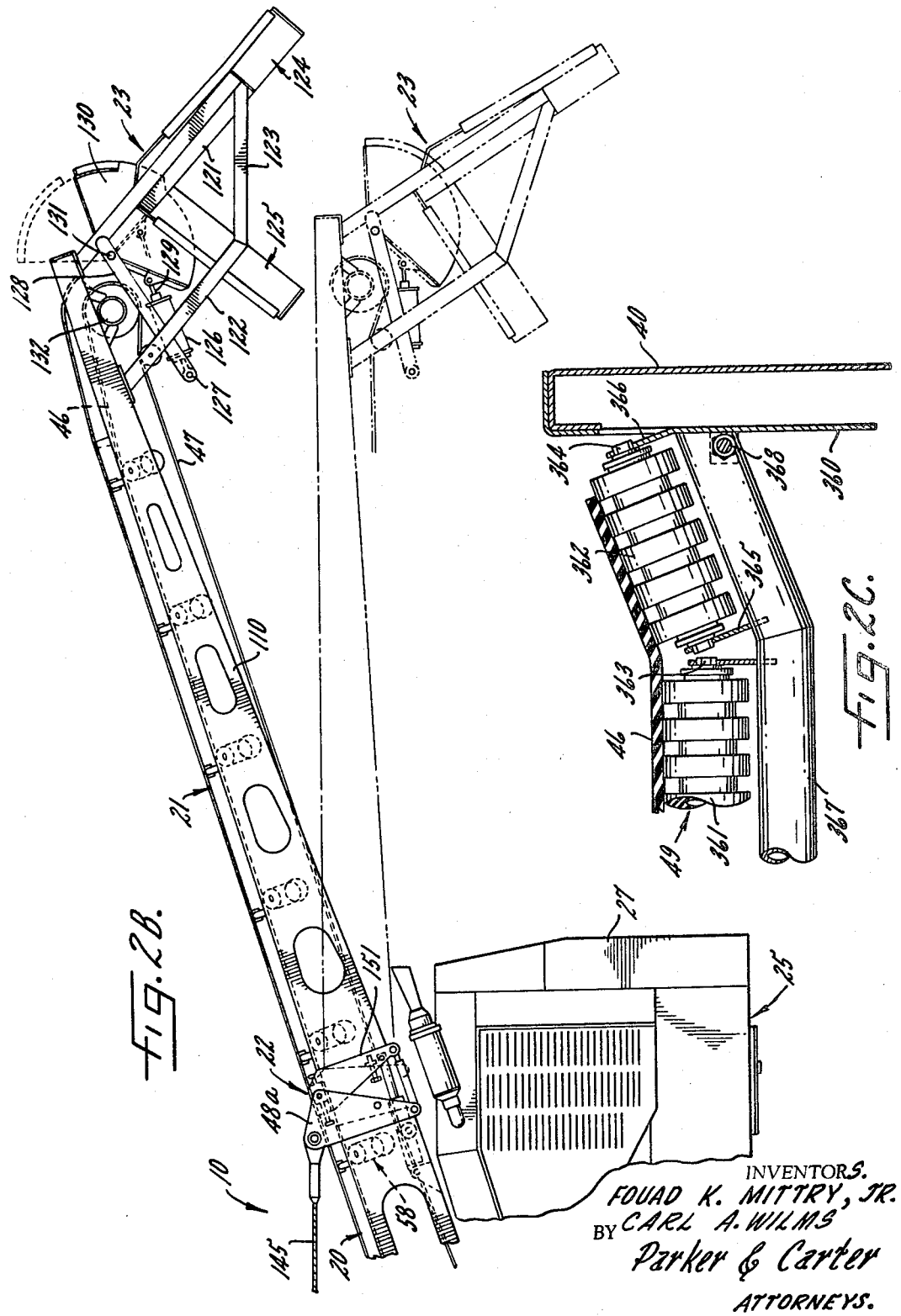
FIGURE 3A is a detail view, to an enlarged scale, of the hinge structure between the sections of the discharge conveyor.
FIGURE 3B is a detail view, to an enlarged scale, of a portion of the hinge structure of FIGURE 3A.

The conveyor sections are maintained in their illustrated FIGURE 3A positions by a pair of struts 163, only one of which is shown in FIGURE 3A. Strut 163 consists essentially of a housing 164 which has an internally threaded bore, and a screw 165. The left end of the housing is pivotally connected by pin 166 to the lower ends of hinge plates 148a, 148b. The expanded head end of screw 165 is connected by a removable pivot pin 167 to the lower ends of hinge plates 151 and 152. When the struts are in the illustrated solid line FIGURE 3 position, the upper and lower sections 21 and 20 of the discharge conveyor are maintained aligned with one another.

Means for swinging the outer end 21 of the discharge conveyor about hinge pin 150 are shown best in FIGURE 3A. A pair of hydraulic cylinders, only one of which, 169, is shown, are pivotally connected by pin 170 to the two sides of the associated side member, in this instance 40. A pair of mounting plates are indicated at 171. The outermost end of piston rod 172 is connected by pin 173 to hinge plates 151 and 152. After pins 167 are pulled and struts 163 swung downwardly out of engagement with hinge plates 151 and 152, extension and retraction of piston rod 172 will swing the rear section 21 counterclockwise and clockwise respectively about hinge pin 150.

A cross pin extending between hinge plates 148a and 148b is indicated at 176. A spacer plate 174 having a threaded bore is welded between the hinge plates 151, 152 and a bolt and nut is indicated at 175 screwed in the spacer plate 174. The spacer plate 174 is so positioned that when the two sections of the conveyor are swung about hinge pin 150, the head of the bolt will strike the cross pin 173. A small hand pump mounted between hinge plates 148a and 148b may be provided for actuating the hydraulic cylinder 169.

*Discharge conveyor positioning system*

The structure for rotating and fixing the position of the discharge conveyor 19 with respect to the rotating base is shown best in FIGURES 2A, 11, 12, and 13.

Referring first to FIGURES 2A and 11, the circular skirt 45 at the lower end of the discharge conveyor is welded to an annular ring 53. The ring in turn is welded to bolt ring 54, best shown in FIGURE 11.

The bolt ring 54 is fastened by means of a number of bolts 182 to mounting ring 183 of the discharge conveyor positioning assembly. Mounting ring 183 and the balance of the discharge conveyor positioning assembly is rotatable with respect to the rotating base 25. The connection between the rotating base and the discharge conveyor positioning system will next be described.

An annular member 184 which forms in effect the center section of the rotating base is welded or otherwise suitably secured to the base 25. A center section flange ring is indicated at 185 welded to the upper edge of annular member 184. A bearing retainer ring 186 is bolted to the flange 185. The upper inner edge of the bearing retainer is cut away to receive the outer race 187 of an X-bearing. The outer race is held in position by a clamp bearing 188 which in turn is bolted to the bearing retainer. The mounting ring 183 is bolted to a composite L-shaped bearing clamp 189, the bearing clamp and mounting ring forming a seat for the inner race of the mounting X-bearing. A split retainer seal plate is indicated at 190 and a pair of oil seal shafts are placed above and below the X-bearing. Thus it will be seen that the discharge conveyor is rotatable about the X-bearing and thereby rotatable with respect to the rotating base structure 25.

A cover plate is indicated at 192 extending outwardly from the inner surface of mounting ring 54. Forward end 192 in turn is welded to inclined plate 193 which is welded at its lower end to dirt tube 194. A gear box mounting bracket 195 is welded or otherwise suitably secured to the dirt tube 194. A generally triangularly shaped stiffening bracket between the mounting bracket and the dirt tube is indicated at 196.

A positioning drive assembly for the discharge conveyor is indicated generally at 198. The assembly includes a hydraulic motor 199, a spring set air-released brake 200, a gear box 201, and a pinion gear 202.

Figure 12:
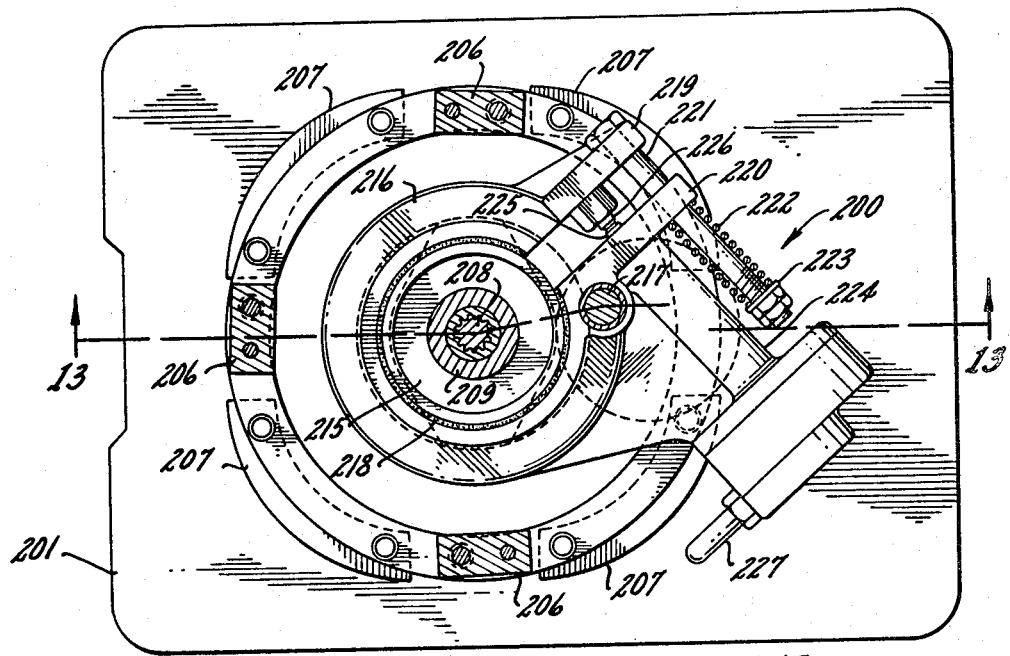
FIGURE 12 is a sectional view taken substantially along the line 12—12 of FIGURE 11 illustrating the spring set-air released brake associated with the discharge conveyor positioning system.
Figure 13:
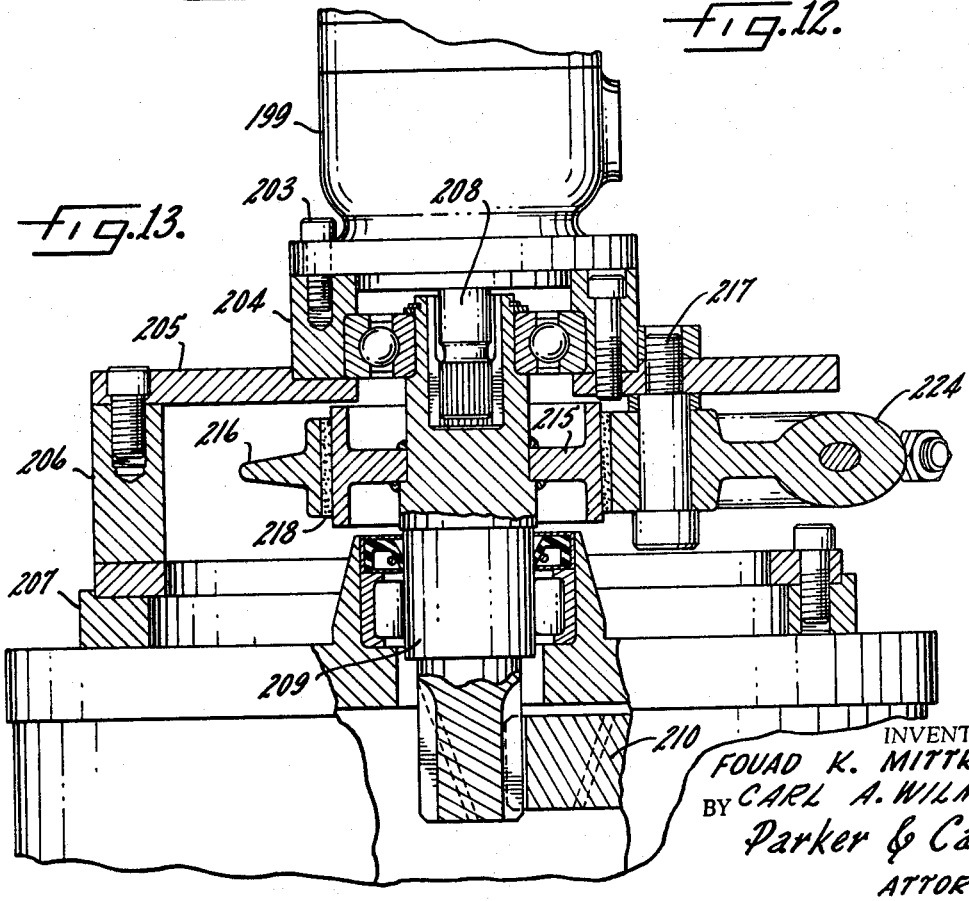
FIGURE 13 is a detail view taken substantially along the line 13—13 of FIGURE 12.

Referring now to FIGURES 12 and 13, the hydraulic motor, spring set air-released brake, and gear-box are there shown in more detail.

Hydraulic motor 199 is bolted as at 203 to adaptor 204 which in turn is bolted to the cover 205 of the brake adaptor 206. Brake adaptor 206 is bolted to a spacer 207 which is welded or otherwise suitably secured to the top or cover of gear box 201. Spacer 207 is actually four individual arcuate shaped spacers as appears best in FIGURE 12.

The output shaft 208 of the motor is connected by means of a spline to input pinion 209 of a gear box, the upper end of the input pinion having an internal spline formed therein which meets with the external spline on the output shaft 208. The lower end of input pinion 209 meshes with the top gear 210 in the gear box. The internal gearing beyond gear 210 is not shown since it is conventional. Suffice it to say that drive pinion 202 of FIGURE 11 is rotated in an appropriate direction, but at a lesser speed, upon actuation of the motor 199 and rotation of output shaft 208.

The springset-air released brake 200 includes a brake drum 215 which is welded to the output shaft 209 of the fluid motor 199. A brake band structure is indicated at 216. The brake band is connected by pin 217 to the rigid cover plate 205 of the brake housing. Friction material between the inner surface of the brake band structure and the outer surface of the drum is indicated at 218. The brake band structure 216 is formed as a split collar having a pair of ears, 219, 220. The ears are apertured to receive a spring bolt 221 which carries a setting spring 222 located between the exterior surface of ear 220 and an abutment washer 223. The spring is biased to urge the ears 219, 220 together, with the resultant compression of the split ring 216 resulting in frictional engagement between the brake drum 215 and brake band 216.

An air release cylinder is indicated at 224. The air cylinder piston rod 225 engages in adjustable set screw 226. Air is admitted to and bled from the cylinder 224 by an air line 227. Extension of piston rod 225 opens the split collar 216 against the pressure of spring 222 which thereby releases the brake pressure between drum 215 and brake band 216, allowing swinging movement of the discharge conveyor with respect to the stationary ring gear next to be described.

A pivotally mounted swing drive ring gear is indicated at 230 in FIGURE 11. The gear is bolted to a three part mounting flange 231, each part of which is indicated by a separate line from the reference numeral. A ring clamp is indicated at 232, the ring clamp forming a carrier for the inner race of bearing 233. The rotating base center section is indicated at 234 and a bearing clamp at 235, bolted to the center section. Suitable seals prevent escape of lubricant from between a center section 234 and ring clamp 232, and between the bearing clamp 235 and ring clamp 232.

*Ladder and wheel*

The rotating wheel and the ladder assembly which supports it are shown best in FIGURES 2A, 4, 14 and 21.

The ladder frame consists of a pair of lower side members 370 and 371 which are maintained a spaced distance apart by cross braces 372, 373 and 374, it being understood that more or less may be used depending on the size of the machine. Side extensions 375, 376 have been added to lower side members 370 and 371 respectively in this instance to provide an anchoring brace for the conveyor.

As best seen in FIGURE 2A the right or discharge end of the ladder extends generally downwardly with respect to the forward half to its pivotal connection 377 to the rotating base. The side members 370 and 371 diverge to form a supporting framework for the conveyor roll assemblies which extend rearwardly to a discharge point which is located some distance above pivot 377 in order to discharge at all times from a point above hopper 56.

In this instance the lower side members 370, 371 and upper extensions 375, 376 have been formed separately and secured to one another. It is quite within the scope of the invention however to form the sections integrally.

The conveyor includes the tail pulley 380, head pulley 381, and an endless, orbitally movable conveyor belt trained around the head and tail pulleys. The conveying reach is indicated at 382 and the return reach at 383.

A plurality of fixed angle conveyor roll assemblies are indicated at 58. Each assembly is substantially identical to the conveyor roll assembly 58 which is described in detail in FIGURES 5 and 6 and will not be again described in detail here. A plurality of impact roll assemblies are indicated at 49, and since these assemblies may be substantially identical to impact roll assemblies 49 in FIGURES 5 and 2C they will not be again described here. It should also be noted that it has been proven to be quite practical to utilize conventional steel shell rollers in this impact area due to the gentleness with which the excavated material is laid on the ladder belt. It is apparent from the foregoing description however that any one or all of the conveyor or impact roll assemblies may be removed while the conveyor belt is trained around the direction changing pulleys. Further, the ladder structure serves the dual capacity of supporting the wheel 11 and providing the framework for the ladder conveyor.

The ladder, and the wheel which will be later described, are raised and lowered in a vertical plane by the screw jacks 384, 385, shown best in FIGURES 2A, 4 and 14. Each jack is pivotally connected to a pair of ears extending outwardly from the forwardmost point of the rotating base. Screw jack 385 for example is pivotally connected by shaft 386 to the ears or extensions 387, 388, which form the forward terminal of arm 389 of the rotating base. Power to raise and lower the screw 390 is furnished by an electric hydraulic motor 391. Alternately each screw may be raised and lowered by its own motor.

In this instance, a single motor associated with jack 384 has been illustrated, the motor driving jack 385 through a power transmission system which includes a cross shaft located beneath discharge pulley 381. The lower end 392 of the vertically movable screw carries a connecting pin 393 which in turn is received in a pair of ears 394, 395 which are welded to a base 396. Base 396 in turn is connected to cross braces 373, and, as best seen in FIGURE 14, the side members 370, 371 are bolted to cross braces 373. It will thus be apparent that the lower end of 392 of the screw rises and falls with respect to the axis of pin 386 of horizontally swingable base 25 which remains at a constant level. The ladder structure, and thereby the wheel, pivot vertically about pivot 377. The right or discharge end of ladder conveyor 18 moves slightly vertically but as can best be seen from FIGURE 2A, sufficient clearance is provided to that there is no interference between the conveyor and the upper edge of hopper 56.

Wheel support cross beam 373 extends a substantial distance outwardly beyond rotating base extension 289. Its outermost end is bolted to the outer ladder wheel support 398. The wheel support 398 is pivotally connected to pivot 377 at its inner end. Its outer end terminates in a split bearing 399, 400, which receives a center rotating shaft 285 of the wheel. A stationary, roughly conical, wheel base or plug sheet is indicated at 401.

Figure 4:
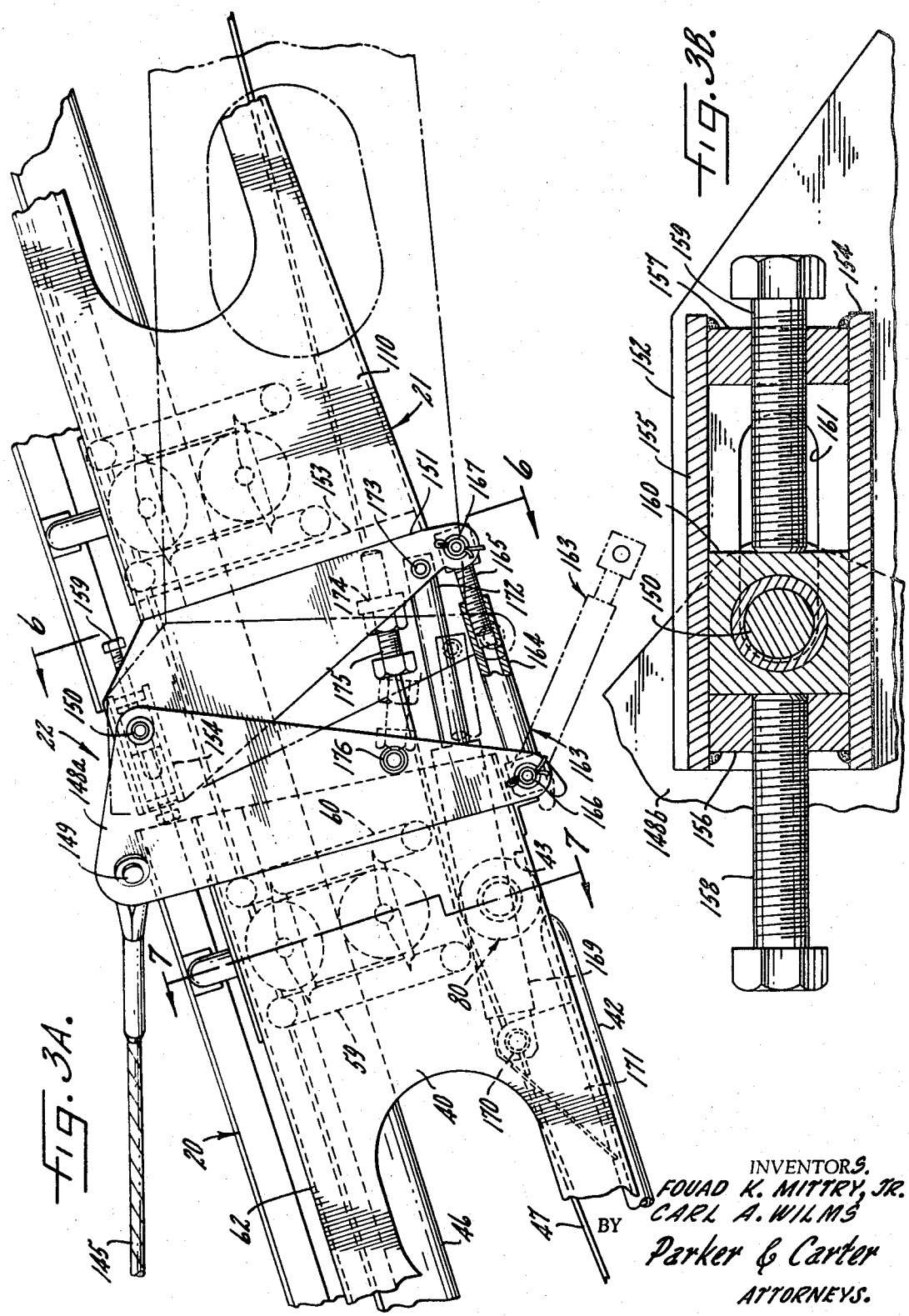
FIGURE 4 is a top plan view, with parts omitted, of the wheel end of the excavator.
Figure 21:
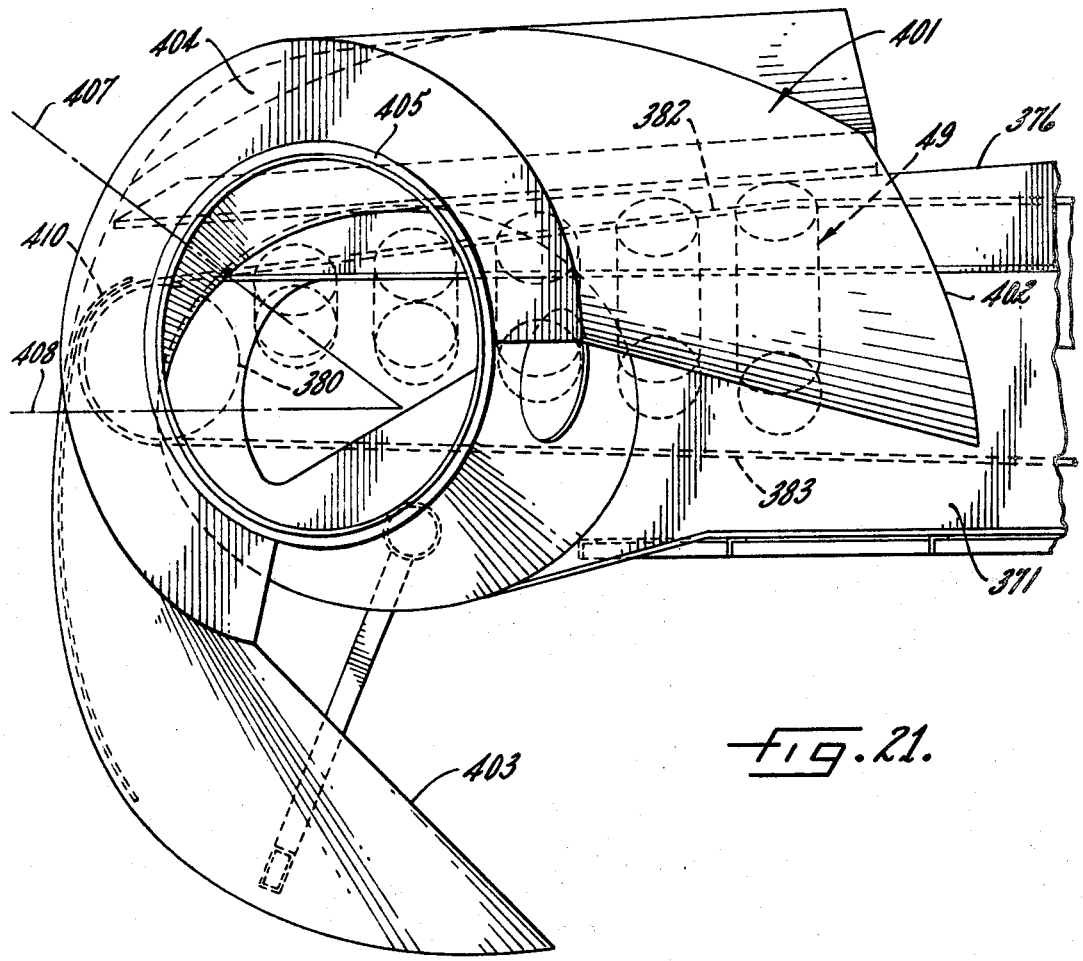
FIGURE 21 is a side view, partly schematic in nature, which illustrates details of the wheel structure.

Referring now to FIGURES 4 and 21, one conical edge of the cone base 401 is welded as at 402 to the outer surfaces of lower side member 371. The other conical edge of the cone base 401 is indicated at 403. The cone base includes an annular end portion 404 which terminates in a connecting ring 405. The wheel structure of wheel 11 in turn is bolted to the conical connecting ring 405.

One of the greatest advantages of the present excavator is the fact that each bucket may discharge during at least a portion of its arc of contact with unexcavated material. As described in further detail herein, each bucket 12-17 has an open bottom, and the bucket skirt 406, see FIGURE 1, has six apertures formed therein, one for each bucket. This enables excavated material in the bucket to commence to fall through the open bottom of the bucket and the wheel cone 406 as soon as the angle of repose of the material in the bucket is exceeded. Thus, referring to FIGURE 21, the radial line 407 may be assumed to be the uppermost point in the swing of each bucket at which the bucket is in digging contact with unexcavated material. The radial line 408 may be assumed to be roughly that point in the arc of swing of the cone wheel at which the angle of repose of the material in each bucket is exceeded, and the material begins to fall through the cone wheel toward the discharge conveyor belt. Although the wheel and ladder assembly are, of course, swinging in a horizontal plane all during the digging cycle so that the material has a small horizontal component of movement as it moves from each bucket to the conveyor, it will be understood that the discharge is so rapid as exemplified by the short time interval consumed in traversing from the position of line 408 to the position of 407 that the material may be considered to be moving in a substantially vertical plane.

Material is prevented from falling into the internal mechanism of the wheel by the plug sheet 404. As best seen in FIGURE 21 the tongue 410 of the plug sheet closely conforms to the contour of tail pulley 380. Material which has fallen through the open bottom bucket toward the plug sheet is prevented from fouling the conveyor system by the plug sheet tongue 410 until the material reaches the end of the tongue. At this point the rapidly moving conveyor belt will "pull" the excavated material rearwardly even though the tongue terminates a few degrees short of top dead center of the tail pulley. During that period of time in which each bucket is moving through the angle formed by radians 407 and 408, it is both filling and emptying, so the bucket functions as a mere funnel.

It will also be noted that impact pulleys 49 are spaced as closely as possible to tail pulleys 380 in order to spread the impact of excavated material over a many impact units as possible.

Further, the tail or loading end of the ladder conveyor is located at a point where excavated material may be gently layed upon the belt without an appreciable change of direction. That is, the excavated material need not be elevated a substantial distance above the conveyor and then dropped downwardly onto it. The material does, of course, traverse a path which has a vertical component of movement in reaching the point from which it is placed on the conveyor. The unique arrangement of wheel conveyor and bucket also makes possible a loading and discharging of each bucket simultaneously during at least a portion of the arc of swing of the bucket. That is, the bucket, during that portion of its travel represented by the angle formed between radial lines 408 and 407 will be both digging (or filling) and discharging so that it is theoretically possible to excavate an amount of material greater than the theoretical amount determined by merely multiplying bucket size times number of buckets times unit of time. As a practical matter the position of indicator lines 407 and 408 will vary depending upon the elevation of the wheel with respect to the upper surface of the bank of material it is digging into.

*Truck frame and suspension system*

The truck frame 30 includes a bolt plate 241 upon which the bottom of the rotating base is received. A central aperture 242 is aligned with the passage formed in the discharge conveyor positioning assembly to enable dirt to fall through. A drive axle is indicated at 243. Sets of double wheels are indicated at 244, 245.

The steering axle is indicated at 250. The welded extension 251 at each end of the steering axle terminates within a sleeve or apertured portion which supports a king pin 252. The king pin is journaled in a yoke 253 from which a stub shaft 254 extends. The stub shaft is rotatably mounted on suitable bearings within a collar 255 which in turn is bolted to wheel frame 256. The rubber tire 257 in turn is mounted on a flange 258.

An axle pivot is indicated at 260. Actually there are a pair, one located ahead and one behind the steering axle. The axle pivots are received in suitable pivot apertures in the bottom of extensions 261 which project downwardly from the frame 30.

A snubbing cylinder is indicated at 262. It is pivotally attached at its upper end as at 263 to an extension 264 from the frame 30. The snubbing cylinder piston is pivotally connected as at 265 to a bracket structure 266 welded or otherwise suitably secured to the steering axle 250. It will be understood that during travel or the propel cycle, the snubbing cylinders are released so that the truck frame 30 and steering axle 250 can swing in a generally vertical plane with respect to one another. During the digging cycle and wheel swing cycle however the snubbing cylinders are locked up to provide in effect a four point rigid suspension. A pair of steering cylinders are indicated at 268 and 269. The cylinders are pivotally connected at their forward ends to extension 270 of the truck frame. The outwardly extending end of the piston rods are pivotally connected to the steering linkages 271, 272, each of which is pivotally connected, respectively, to an associated wheel frame structure 256.

*Wheel assembly*

One-half of the wheel assembly has been illustrated, with parts omitted, in FIGURE 15. Drive shaft 280 from the engine and torque connector furnishes power for rotation of the wheel. One-half of a universal joint is indicated at 281. An input pinion is indicated at 282, the pinion shaft being supported in bearings in the housing 283. Pinion 282 meshes with bevel gear 284 carried by shaft 285 which is mounted in suitable bearings at its ends. Shaft 285 also carries a floating sun gear 286 which forms part of the first planetary gear assembly. Although the shaft 285 is shown as being continuous from bevel gear 284 to sun gear 286 it will be understood that it may be formed in separable portions and the individual portions splined or otherwise suitably secured one to the other.

Sun gear 286 meshes with a plurality of first stage planetary gears, one of which is indicated at 287. The planetary gears are suitably journaled in a gear cage 287a and rotation of the gear cage in turn induces rotation via ring gear 287b of the second stage planetary gear system which comprises sun gear 288 and a plurality of planetary gears 289. The planetary gears are in mesh with a second stage ring gear 290 which is best illustrated in FIGURE 17. The ring gear is suitably connected as by bolts 291 to the outer gear housing 292.

Rotation of ring gear 290 rotates the cone wheel 11 and particularly the housing indicated generally at 294, upon which the buckets are mounted. As best seen in FIGURE 17, the wheel housing 294 consists of inner and outer walls 295, 296 respectively. The walls are welded at their radially inner ends to a ring 297. A plurality of keys are welded about the periphery of the ring, one of the keys being shown in 298. The left end of the wheel housing is tapered as at 299 to match the complementary taper on the shoulder of ring gear 290. Keys 298 are in mesh with projections or teeth 300 which extend peripherally outwardly from the exterior periphery of the ring gear 290.

A unique clamping arrangement is illustrated in detail in FIGURE 17. A wedge is indicated at 301, the wedge having a tapered surface which is complementary to a similarly tapered surface to the right or inner end of ring 297. A clamp 302 forces the wedge in snug abutting engagement with the base ring 297 of the housing 294 and clamps the cone wheel to the ring gear 290. A plurality of studs and lock nuts, one of which is indicated at 303, secures the clamp to the ring 297.

A shield is indicated at 304, the shield being rotatable with the bucket cone housing. The shield is connected by means of bolts 305 to a ring 306 which in essence is an extension of a longitudinal section 307 of the ring gear. The longitudinal section 307 is formed integrally with the radially inner end of a flange 308 of the ring gear. The shoulder 309 forms the outer retainer for a wheel drive bearing 310, the ring 306 forming the inner retainer for the bearing.

*Bucket assembly*

Figure 18:
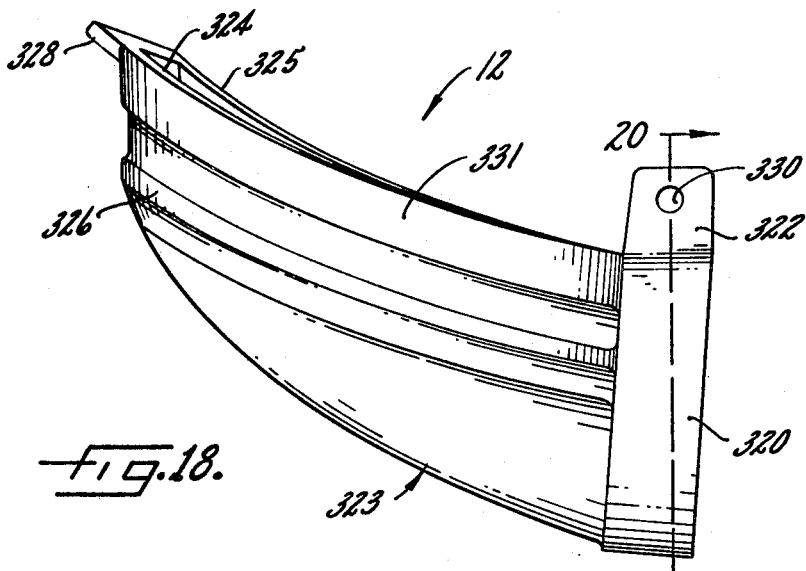
FIGURE 18 is a side view of one of the non-planar maw buckets especially adapted for use with the cone-shaped digging wheel.
Figure 19:
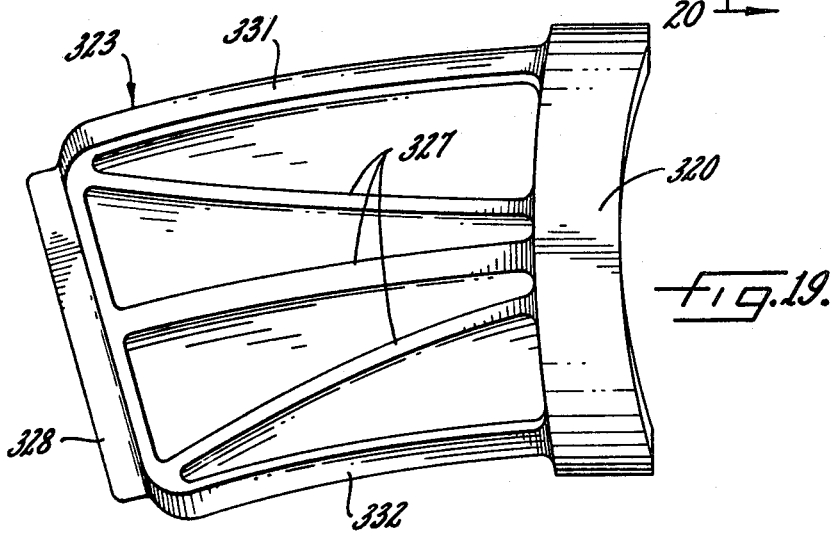
FIGURE 19 is a bottom view of the bucket of FIGURE 18.
Figure 20:
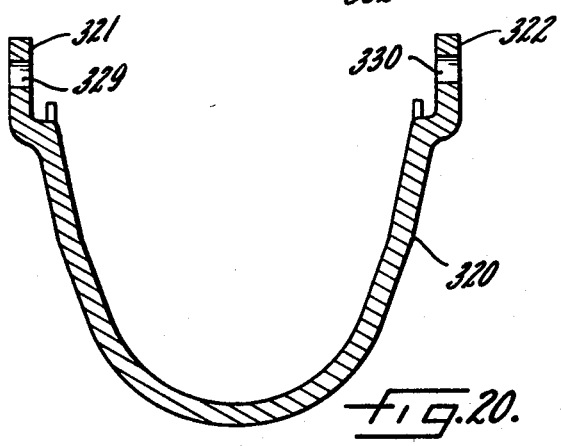
FIGURE 20 is a sectional view taken substantially along the line 20—20 of FIGURE 18.

In FIGURES 18, 19 and 20 one of the buckets is shown in detail.

The bucket is shown in a side view in FIGURE 18. Bucket 12 includes a generally U-shaped tooth mounting member 320, the ends of which form a pair of lugs 321 and 322, each of which is apertured for connection to a mounting structure within the cone wheel housing 294. The body portion 323 extends rearwardly from the tooth mounting member 320. Edges 324 and 325 are flush to the outer surface of cone housing 294. A plurality of suitable strengthening ribs are indicated at 326 and 327 and a clamping lip at 328, shown best in FIGURE 1. The buckets are so arranged that the side of longest dimension, that is side 331, will be disposed at the larger diameter of the cone 294, and the short edge, 332, will be disposed closest to the apex of the cone housing 294.

Carryover of excavated material is substantially entirely eliminated by the provision of cut away areas 411 in the wheel cone 406, each cut away extending forwardly from the opening in the wheel cone underlying each bucket. The provision of these cut away areas eliminates the wedging of large chunks of material between the bucket teeth and wheel cone surface, and their consequent discharge on the downswing portion of their revolution.

*Conveyor drive pulley assembly*

A typical conveyor drive pulley assembly usable on either a rubber tire or crawler type excavator is indicated generally at 412 in FIGURE 22. The assembly includes a pulley or casing 413 which preferably is slightly crowned. The pulley is very thin and carries a layer of lagging 414. A pair of mounting brackets are indicated at 415 and 416.

Bracket 415 includes a mounting plate 417 which is adapted to rest on, and be secured to, the conveyor sideframe 418, as by bolts 419. The inner wall 420 of the bracket includes a motor mounting plate 421 having a central aperture therein. A hydraulic motor 423 is bolted to the mounting plate 421 with its output shaft 424 axially aligned with the central aperture.

Left bracket 416 includes a similar centrally apertured plate 426, the plate having secured thereto a bearing support structure 427. Since the remainder of the bracket is functionally and structurally similar to bracket 415 it is not further described.

The motor shaft 424 is spline connected to a shaft extension 428 which terminates in a pinion gear 429. A thrust button supported in the hollow bearing support structure 427 is indicated at 430, its purpose being to relieve the bearings of axial thrust by transmitting any such thrust to the mounting bracket 416.

Pinion 429 is in driving engagement with three cluster gears 431, each of which is mounted on a shaft rotatably supported at both ends by a stationary planetary cage 433. Each cluster gear 431 is in driving engagement with ring gear 436 which in turn is welded or otherwise suitably secured to the internal surface of pulley 413 by a cover structure 437. The outermost portion 438 of the cover structure serves as the outer race for a bearing 439 which enables the pulley to rotate about the stationary bearing support structure 427.

The inner plate of the planetary cage is welded to a shaft extension housing 441 which in turn is welded at its outer end to a sleeve 442 and motor mounting plate 421.

An annular support wall 443 provides a seat for the outer race of bearing 444. The sleeve 442 forms a seat for the inner race so that wall 443, like ring gear 436, rotates about the stationary internal structures.

The gears rotate in a sealed bath of oil in a manner well known in the art. An air breather filter may be provided at one or more locations.

Insertion and removal of the assembly for mounting or replacement is a simple matter. The bolts securing the mounting brackets to the sideframe 418 are loosened, the motor 423 disconnected, and the entire assembly lifted out and a substitute replaced. Work on the removed assembly can be done at leisure.

The placement of the internal support walls 443 and 437 at locations approximately one-third the length of the pulley from each end provides a maximum of support by reducing the unsupported spans of the pulley to a minimum. Consequently the pulley may be very light in weight for its size, and as a practical matter T-1 steel may be advantageously employed.

We claim:

1. An excavator wheel especially adapted for use in a direct dumping wheel excavator, said excavator wheel including
   a generally cone-shaped bucket carrying member and means for supporting it for rotation about an axis,
   said bucket carrying member having a plurality of openings therein, each opening being irregularly shaped to accommodate an opening in a bucket disposed thereover,
   each of the bucket carrying member openings and each of the bucket openings being longer on the side nearest the largest diameter portion of the cone shaped bucket carrying member than the side nearest the apex of the cone shaped bucket carrying member.

2. The process of excavating with an excavator wheel and removing excavated material to a distant discharge zone, said excavator wheel being forwardly disposed with respect to the discharge zone, including the steps of simultaneously excavating plural batches of material, sequentially moving said batches of material forwardly, upwardly and laterally to an elevated position along a path which has a vertical component of movement, forming a material transfer zone in the overlap between the path of movement of said batches and removal means which is disposed in discharge relationship to the path of movement of said batches, sequentially gravitationally discharging said material in free fall downwardly and rearwardly in substantially vertical planes from said elevated position directly onto the removal means with substantially no impact, and removing said excavated material to the discharge zone.

3. The process of claim 2 further characterized in that material is simultaneously added to and discharged from each batch of material during at least a portion of the excavating step.

4. The process of claim 2 further characterized in that at least a portion of said excavated material does not appreciably change position between its unexcavated position and the aforesaid point of downward and rearward discharge.

5. The process of claim 2 further characterized in that removal of the excavated material to the discharge zone includes,
   directing the material to one of a plurality of areas in the discharge zone, each area corresponding to a mass of material to be formed, and
   redirecting the material to a subsequent area upon the attainment of a desired mass size in a preceding area.

6. The process of claim 5 further characterized, firstly, in that at least one point in the path of movement of the plural batches of material is substantially coincident with a point on the material removal means, and secondly, that initiation of gravitational, free fall discharge of material onto the material removal means occurs substantially at the aforesaid point of substantial coincidence whereby at least a portion of said material is placed on the material removing means with substantially no impact.

7. The process of claim 5 further characterized in that the material on the material removal means is moved along a path which is disposed in angular relationship to the path of movement of the batches of excavated material as they are moved to an elevated position.

8. The process of excavating with an excavator wheel and removing excavated material to a distant discharge zone, said excavator wheel being forwardly disposed with respect to the discharge zone, including the steps of
   simultaneously excavating plural batches of material by advancing a plurality of material receiving receptacles along a path of movement of substantially constant width, said path having a vertical component,
   forming a material transfer area in the overlap between the path of movement of the receptacles and removal means which is disposed in discharge relationship to the path of movement of the receptacles,
   at least one point in the path of movement of the receptacles being substantially coincident with a location on the removal means,
   sequentially moving said batches of material forwardly upwardly and laterally to an elevated position,
   sequentially gravitationally discharging said material in free fall downwardly and rearwardly in substantially vertical planes from said elevated position directly onto the removal means with substantially no impact,
   at least a portion of the discharge of the gravitationally impelled, free falling material occurring substantially at the point of substantial coincidence of the path of movement of the receptacles and said location on the removal means, and
   removing said excavated material to the discharge zone.

9. The process of excavating with an excavator wheel and removing excavated material to a distant discharge zone, said excavator wheel being forwardly disposed with respect to the discharge zone, including the steps of
   simultaneously excavating plural batches of material by advancing a plurality of material receiving receptacles along a path of excavating movement which has a vertical component,
   forming a material transfer zone in the overlap between the path of excavating movement of the receptacles and material removal means which is disposed in discharge relationship to the path of movement of the receptacles,
   sequentially moving said batches of material forwardly upwardly and laterally to an elevated position,
   sequentially gravitationally discharging at least an initial portion of said material in free fall downwardly and rearwardly in substantially vertical planes from said elevated position directly onto the material removal means at a location associated with the material transfer zone which is substantially common to both the path of excavating movement and the material removal means whereby at least a portion of the material is transferred to the material removal means with substantially no impact and moving said excavated material to the discharge zone.

10. A self-propelled wheel excavator, said wheel excavator including, in combination, a wheel supported truck frame, a base supported on and rotatable with respect to the truck frame, an excavator wheel carried by and movable in a generally vertical direction with respect to the rotating base, conveying means for conveying material dug by the wheel to a discharge area located a substantial distance from the excavator wheel, said conveying means including, firstly, a ladder conveyor carried by a ladder assembly, said ladder conveyor extending from a forward point where material from each bucket may be directly deposited thereon to a rearward point on the rotating base, said ladder conveyor being swingable with the ladder assembly and rotating base, and secondly, a discharge conveyor extending from a location at which it receives material from the ladder conveyor to a remote discharge point, said rotating base having an opening therethrough at a location substantially aligned with the discharge end of the ladder conveyor and pick-up end of the discharge conveyor to thereby direct spillage between the conveyors into a localized area.

11. An excavator wheel assembly, said assembly including, in combination a bucket mounting base, a plurality of buckets mounted on the base, said bucket base being cut away in the area underlying each bucket to thereby form an open bottom bucket, and a support base means, said support base means being disposed within the bucket mounting base to thereby provide a bottom for the bucket, said support base means being radially co-extensive with the bucket mounting base throughout at least that portion of the path of travel of each bucket during which premature discharge from the bucket can occur, and being open in a radially inward direction in a discharge area commencing substantially at the level of a belt conveyor disposed within the bucket mounting base, said belt conveyor having one end portion disposed within the path of movement of the buckets whereby said buckets pass over the belt conveyor in discharge relationship with respect thereto during their movement, said belt conveyor being disposed at an acute angle with respect to the plane of rotation of the wheel to thereby form a transfer area having a maximum length dimension longer than the width of the belt, said conveyor including an end pulley mounted within the wheel and positioned closely adjacent the open area in said support base means whereby material in the buckets may pass directly onto the belt conveyor with substantially no impact.

12. The excavator wheel assembly of claim 11 further characterized in that, the support base means includes a plug sheet having a portion whose terminal end radially overlies the conveyor end pulley at a point where the conveyor belt is effective to remove material discharged over the terminal end of said portion.

13. In a method of material transfer, the steps of forming a batch of material to be transferred, moving said material along a path which has a vertical component of movement to a point at which it is elevated to, but not significantly above a material receiving area on material removal means, said material receiving area lying in a material transfer zone formed where the path of movement of the batch overlaps the material removal means, gravitationally depositing said batch of material directly onto the material receiving area with substantially no impact by moving said material in substantially vertical planes.

14. The method of claim 13 further including the step of moving the gravitationally deposited material unidirectionally to a discharge point remote from its point of deposition onto the material receiving area.

15. The method of claim 13 further characterized in that a plurality of batches is formed and deposited at least one batch being formed while another is being gravitationally deposited on the material removal transfer means.

16. A method of digging, said method including the steps of advancing a plurality of material receiving receptacles along a path of digging movement whereby material is admitted to the receptacles moving the material along a path which has a vertical component of movement to a material transfer area defined by the overlap between the path of movement of the receptacles and material removal means which is disposed beneath and in angular relationship to the path of movement of the material receiving receptacles, gravitationally depositing the material onto the material removal means with substantially no impact by initiating gravitational free fall transfer, in substantially vertical planes, of material in the material receiving receptacles directly onto the removal means at a portion of the periphery of the material transfer area which is substantially coincident with the path of movement of the receptacles, and removing the material to a discharge zone.

17. A method of digging, said method including the steps of moving a material receiving receptacle along a path of digging movement whereby material is admitted to the receptacle, moving the material along a path which has a vertical component of movement to a material transfer zone defined by the overlap between the path of movement of the receptacle and material removal means, gravitationally depositing the material onto the material removal means with substantially no impact by at least initiating gravitational, free fall transference, in substantially vertical planes, of material in the receptacle directly onto the material removal means at a location associated with the material transfer zone which is substantially common to both the path of movement of the receptacle and the material removal means, and moving the material from the material transfer zone.

18. The method of claim 17 further including the step of simultaneously admitting material to, and discharging material from, the receptacle during at least a portion of the movement of the receptacle along its path of digging movement.

References Cited

UNITED STATES PATENTS

| | | | |
|---|---|---|---|
| 779,442 | 1/1905 | Richmond et al. | 37—190 |
| 796,477 | 8/1905 | Wallace | 198—68 |
| 2,032,911 | 3/1936 | Brown | 37—190 |
| 2,263,506 | 11/1941 | Lane. | |

(Other references on following page)

UNITED STATES PATENTS

| | | | |
|---|---|---|---|
| 2,826,839 | 3/1958 | Kolbe | 37—190 |
| 2,909,855 | 10/1959 | Kolbe | 37—96 X |
| 2,926,438 | 3/1960 | Kolbe | 37—95 X |
| 2,994,546 | 8/1961 | Cooper | 280—111 |
| 3,020,656 | 2/1962 | Linden | 37—190 |
| 3,043,035 | 7/1962 | Fogelberg | 37—190 |
| 3,091,874 | 6/1963 | Wuigk | 37—190 |

FOREIGN PATENTS

| | | |
|---|---|---|
| 740,716 | 10/1943 | Germany. |
| 30,093 | 1913 | Great Britain. |
| 600,965 | 8/1934 | Germany. |
| 635,375 | 9/1936 | Germany. |

OTHER REFERENCES

German printed application A 17,667, June 1956, Linden.

Braukohle: Issue number 15, a technical publication of the Deutaches Braunkohlen Industries Verein Corp., published in Halle, Germany, in 1941. The article entitled "Technische Umschau" appearing on pages 173–175 relied on.

Excavating Engineer, dated December, 1960, the article entitled "How the Wheel Excavator Works" appearing on pages 27–31 relied on.

ABRAHAM G. STONE, *Primary Examiner.*

R. L. HOLLISTER, *Assistant Examiner.*